US011235558B2

(12) United States Patent
Adachi et al.

(10) Patent No.: US 11,235,558 B2
(45) Date of Patent: *Feb. 1, 2022

(54) SOLAR RADIATION SHIELDING LAMINATED STRUCTURE AND METHOD FOR PRODUCING THE SAME

(71) Applicant: SUMITOMO METAL MINING CO., LTD., Tokyo (JP)

(72) Inventors: Kenji Adachi, Ichikawa (JP); Satoshi Yoshio, Tokyo (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/647,864

(22) PCT Filed: Sep. 14, 2018

(86) PCT No.: PCT/JP2018/034238
§ 371 (c)(1),
(2) Date: Mar. 16, 2020

(87) PCT Pub. No.: WO2019/054497
PCT Pub. Date: Mar. 21, 2019

(65) Prior Publication Data
US 2020/0331238 A1    Oct. 22, 2020

(30) Foreign Application Priority Data

Sep. 15, 2017    (JP) .............................. JP2017-177884

(51) Int. Cl.
*B32B 17/10*    (2006.01)
*B32B 27/18*    (2006.01)

(52) U.S. Cl.
CPC ........ *B32B 17/10165* (2013.01); *B32B 17/10* (2013.01); *B32B 27/18* (2013.01)

(58) Field of Classification Search
CPC ... B32B 17/10; B32B 17/10165; B32B 27/18; C01B 35/04
See application file for complete search history.

(56) References Cited

U.S. PATENT DOCUMENTS 6,319,613 B1    11/2001 Takeda et al.
2004/0028920 A1    2/2004 Fujita et al.
(Continued)

FOREIGN PATENT DOCUMENTS

CN    104894641 A    9/2015
JP    H08-217500 A    8/1996
(Continued)

OTHER PUBLICATIONS

Koshio et al., "Optical properties of group-3 metal hexaboride nanoparticles by first-principles calculations," The Journal of Chemical Physics, 2016, vol. 144, pp. 234702-1-234702-11.
(Continued)

*Primary Examiner* — Lawrence D Ferguson
(74) *Attorney, Agent, or Firm* — Oliff PLC

(57) ABSTRACT

A solar radiation shielding laminated structure, having high visible light transmission property and solar radiation shielding property, low haze value, and high environmental stability with inexpensive production cost, using solar radiation shielding fine particles having high visible light transmission property and excellent solar shielding property and weather resistance, and provides a solar radiation shielding laminated structure in which an interlayer is sandwiched between two laminated sheets; the interlayer having, as an intermediate film, one or more kinds selected from a resin sheet containing solar radiation shielding fine particles and a resin film containing solar radiation shielding fine particles, the laminated sheets being selected from a sheet-glass not containing solar radiation shielding fine particles and a resin board not containing solar radiation shielding fine (Continued)

particles; wherein the solar radiation shielding fine particles are solar radiation shielding fine particles containing calcium lanthanum boride fine particles represented by general formula $Ca_xLa_{1-x}B_m$.

8 Claims, 5 Drawing Sheets

(56) References Cited

U.S. PATENT DOCUMENTS

| | | |
|---|---|---|
| 2006/0008640 A1 | 1/2006 | Chonan et al. |
| 2006/0009559 A1 | 1/2006 | Fujita et al. |
| 2017/0283311 A1 | 10/2017 | Machida et al. |

FOREIGN PATENT DOCUMENTS

| | | |
|---|---|---|
| JP | 2000-169765 A | 6/2000 |
| JP | 2001-089202 A | 4/2001 |
| JP | 2004-59875 A | 2/2004 |
| JP | 3985193 B2 | 10/2007 |
| JP | 2017145163 A | 8/2017 |
| JP | 2017145164 A | 8/2017 |
| JP | 2018-141114 A | 9/2018 |
| WO | 2016/031969 A1 | 3/2016 |
| WO | 2018/159029 A1 | 9/2018 |

OTHER PUBLICATIONS

Machida et al., "Particle shape inhomogeneity and plasmon-band broadening of solar-control LaB6 nanoparticles", Journal of Applied Physics, 2015. vol. 118, 013103-1-013103-10.

Nishikawa, "Powder or Boron Compound at Present;" 1987; pp. 40-45; vol. 22, No. 1.

Doi, "Lanthanum Hexa-Boride Powder-Properties and Preparation Method," 1989; pp. 66-70; vol. 21, No. 5.

Nov. 27, 2018 International Search Report issued in International Patent Application No. PCT/JP2018/034238.

SOLAR RADIATION SHIELDING LAMINATED STRUCTURE AND METHOD FOR PRODUCING THE SAME

TECHNICAL FIELD

The present invention relates to a solar radiation shielding laminated structure used for a window material or the like for a vehicle such as a car, for a building, and for an airplane, and a process for producing the same.

DESCRIPTION OF RELATED ART

Conventionally, as a glass used for a window material or the like for a car, a building, or the like, laminated glass formed by sandwiching solar radiation shielding layer between two pieces of sheet-glass, which shields the incident solar energy to reduce cooling load and heat sensation has been proposed.

For example, Patent Document 1 proposes a laminated glass in which a soft resin layer is interposed between two pieces of sheet-glass, and ITO or ATO as a heat ray shielding metal oxide is contained and dispersed.

On the other hand, the present applicants disclose, in Patent Document 2, a solar radiation shielding laminated glass in which an interlayer having a solar radiation shielding function is interposed between two pieces of sheet-glass, the interlayer containing hexaboride fine particles alone or hexaboride fine particles, ITO fine particles and/or ATO fine particles, and vinyl resin.

Furthermore, the present applicants disclose, in Patent Document 3, a solar radiation shielding laminated glass containing tungsten oxide fine particles having high transparency and high solar radiation shielding function.

PRIOR ART DOCUMENT

Patent Document

[Patent Document 1] Japanese Patent Laid-Open Publication No. 1996-217500
[Patent Document 2] Japanese Patent Laid-Open Publication No. 2001-89202
[Patent Document 3] Japanese Patent No. 3985193

Non-Patent Document

[Non-Patent Document 1] Satoshi Yoshio, Koichiro Maki and Kenji Adachi, "Optical properties of group-3 metal hexaboride nanoparticles by first-principles calculations", J. Chem. Phys., Vol. 144, 234702 (2016)
[Non-patent document 2] K. Machida and K. Adachi, "Particle shape inhomogeneity and plasma band broadening of solar-control LaB6 nanoparticles", J. Appl. Phys., 118, 013103 (2015)
[Non-Patent Document 3] Ceramics, 22 volumes, 1987, pp 40-45 by Hiroshi Nishikawa
[Non-patent document 4] Powder and industry, 21 (5) 1989 by Doi

SUMMARY OF THE INVENTION

Problem to be Solved by the Invention

As a result of study by the present inventors, the following problems were found.

First, ITO and ATO used for the laminated glass described in Patent Document 1 have a low shielding effect against a near-infrared radiation at a wavelength about 800 to 1000 nm. On the other hand, regarding the solar radiation, since the intensity of the wavelength is high, the laminated glass cannot suppress the scorching sensation to skin. In addition, their raw material, In, is very expensive because of its limited amount, which bottlenecks their popularization.

Secondly, the hexaboride fine particles described in Patent Document 2 are excellent in the ability to absorb the near-infrared radiation at wavelengths from 800 to 900 nm, have a high effect of preventing the scorching sensation to skin, and advantageously achieve an effect even when added in a trace amount because of their high absorption coefficient. However, since their visible light transmission property is slightly inferior at wavelengths other than the green wavelength, they have a disadvantage of giving the glass a greenish color.

Furthermore, tungsten bronze fine particles having a hexagonal crystal structure described in Patent Document 3 are excellent in transparency and near-infrared absorption ability among tungsten oxide fine particles, and achieve high solar radiation shielding property so that the visible light transmittance is 70% and the solar radiation transmittance is 40% or less. However, while the tungsten bronze fine particles have such excellent optical properties, they have environmental instability, for example, they react with moisture, which deteriorates their shielding function. Therefore, they have a disadvantage of involving cost for preventive measures.

The present invention is achieved by focusing on these problems, and an object of the present invention is to provide a solar radiation shielding laminated structure and a method for production thereof, the laminated structure having high visible light transmission property and solar radiation shielding property, low haze value, and high environmental stability and being inexpensive in production cost, using solar radiation shielding fine particles having high visible light transmission property and excellent solar radiation shielding property and having weather resistance.

Means for Solving the Problem

In order to solve the above-described problem, the present inventors conducted intensive research, and obtain finding such that fine particles which are calcium lanthanum boride fine particles having a predetermined shape represented by a general formula $Ca_xLa_{1-x}B_m$ (satisfying $0.001 \leq x \leq 0.800$, $5.0 \leq m < 6.3$) has a strong heat ray absorbing effect and at the same time has a broad visible light transmission property and stable weather resistance. Accordingly, the present inventors found a solar radiation shielding laminated structure, containing the calcium lanthanum boride fine particles as solar radiation shielding fine particles, and thus completed the present invention.

Namely, a first invention to solve the above-described problem provides a solar radiation shielding laminated structure in which an interlayer is sandwiched between two laminated sheets;
  the interlayer having, as an intermediate film, one or more kinds selected from a resin sheet containing solar radiation shielding fine particles and a resin film containing solar radiation shielding fine particles,
  the two laminated sheets being selected from a sheet-glass not containing solar radiation shielding fine particles and a resin board not containing solar radiation shielding fine particles;

wherein the solar radiation shielding fine particles are solar radiation shielding fine particles containing calcium lanthanum boride fine particles represented by general formula $Ca_xLa_{1-x}B_m$, a value of x is in a range of $0.001 \leq x \leq 0.800$, and a value of m is in a range of $5.0 \leq m < 6.3$ in the general formula, an average dispersed particle size of the calcium lanthanum boride fine particles is 1 nm or more and 800 nm or less, and a fine particle shape of the calcium lanthanum boride fine particles is at least one shape selected from the following 1) and 2):

1) a shape in which a scattering intensity of the calcium lanthanum boride fine particles diluted and dispersed in a solvent measured using a small-angle X-ray scattering method is such that a slope value Ve of a straight line obtained by double-logarithmic plotting of a relationship between scattering vector $q=4\pi \sin \theta/\lambda$, and scattering intensity I(q) is in a range of $-3.8 \leq Ve \leq -1.5$;
2) a flat cylindrical (wherein a diameter of a bottom circle is d and a height of a cylinder is h) shape, or a spheroidal (wherein a length of a long axis is d and a length of a short axis is h) shape, with a value of aspect ratio d/h being in a range of $1.5 \leq d/h \leq 20$.

A second invention provides a solar radiation shielding laminated structure in which an interlayer is sandwiched between one laminated sheet and another laminated sheet;

the interlayer having one or more kinds of intermediate films selected from a resin sheet containing solar radiation shielding fine particles and a resin film containing solar radiation shielding fine particles and one or more intermediate films selected from a resin sheet not containing solar radiation shielding fine particles and a resin film not containing solar radiation shielding fine particles, the one laminated sheet being selected from a sheet-glass not containing solar radiation shielding fine particles, a resin board not containing solar radiation shielding fine particles, and a resin board containing solar radiation shielding fine particles, and the other laminated sheet including solar radiation shielding fine particles;

wherein the solar radiation shielding fine particles are solar radiation shielding fine particles containing calcium lanthanum boride fine particles represented by general formula $Ca_xLa_{1-x}B_m$, a value of x is in a range of $0.001 \leq x \leq 0.800$, and a value of m is in a range of $5.0 \leq m < 6.3$ in the general formula, an average dispersed particle size of the calcium lanthanum boride fine particles is 1 nm or more and 800 nm or less, and a fine particle shape of the calcium lanthanum boride fine particles is at least one shape selected from the following 1) and 2):

1) a shape in which a scattering intensity of the calcium lanthanum boride fine particles diluted and dispersed in a solvent measured using a small-angle X-ray scattering method is such that a slope value Ve of a straight line obtained by double-logarithmic plotting of a relationship between scattering vector $q=4\pi \sin \theta/\lambda$ and scattering intensity I(q) is in a range of $-3.8 \leq Ve \leq -1.5$;
2) a flat cylindrical (wherein a diameter of the bottom circle is d and a height of the cylinder is h) shape, or a spheroidal (wherein a length of a long axis is d and a length of the short axis is h) shape, with a value of aspect ratio d/h being $1.5 \leq d/h \leq 20$.

A third invention provides the solar radiation shielding laminated structure according to the first or second invention, wherein, when solar radiation shielding fine particles are included in two or more of the intermediate film and the laminated sheet, at least one layer includes solar radiation shielding fine particles containing the calcium lanthanum boride fine particles, and at least one of the other layer includes solar radiation shielding fine particles having solar radiation shielding property different from that of the solar radiation shielding fine particles.

A fourth invention provides the solar radiation shielding laminated structure according to the third invention, wherein the solar radiation shielding fine particles having solar radiation shielding function different from that of the solar radiation shielding fine particles containing calcium lanthanum boride fine particles are at least one kind of solar radiation shielding fine particles selected from calcium lanthanum boride fine particles having solar radiation shielding function different from that of the calcium lanthanum boride fine particles, hexagonal crystal tungsten bronze fine particles, Sn-doped indium oxide fine particles, Sb-doped tin oxide fine particles, and Al-doped zinc oxide fine particles, and Ga-doped zinc oxide fine particles.

A fifth invention provides the solar radiation shielding laminated structure according to any one of the first to fourth inventions, wherein the resin material forming the resin board, resin sheet, and resin film is one kind selected from polycarbonate resin, acrylic resin, and polyethylene terephthalate resin.

A sixth invention provides the solar radiation shielding laminated structure according to any one of the first to fourth inventions, wherein the resin material forming the interlayer is vinyl resin.

A seventh invention provides the solar radiation shielding laminated structure according to the sixth invention, wherein the vinyl resin is polyvinyl butyral or ethylene-vinyl acetate copolymer.

An eighth invention provides a method for producing a solar radiation shielding laminated structure in which an interlayer is sandwiched between two laminated sheets;

the interlayer having, as an intermediate film, one or more kinds selected from a resin sheet containing solar radiation shielding fine particles and a resin film containing solar radiation shielding fine particles, the laminated sheets being selected from a sheet-glass not containing solar radiation shielding fine particles and a resin board not containing solar radiation shielding fine particles;

wherein the solar radiation shielding fine particles are solar radiation shielding fine particles containing calcium lanthanum boride fine particles represented by general formula $Ca_xLa_{1-x}B_m$, a value of x is in a range of $0.001 \leq x \leq 0.800$, and a value of m is in a range of $5.0 \leq m < 6.3$ in the general formula, an average dispersed particle size of the calcium lanthanum boride fine particles is 1 nm or more and 800 nm or less, and a fine particle shape of the calcium lanthanum boride fine particles is at least one shape selected from the following 1) and 2):

1) a shape in which a scattering intensity of the calcium lanthanum boride fine particles diluted and dispersed in a solvent measured using a small-angle X-ray scattering method is such that a slope value Ve of a straight line obtained by double-logarithmic plotting of a relationship between scattering vector q=4π sin θ/λ and scattering intensity I(q) is in a range of −3.8≤Ve≤−1.5; 2) a flat cylindrical (wherein a diameter of a bottom circle is d and a height of a cylinder is h) shape, or a spheroidal (wherein a length of a long axis is d and a length of a short axis is h) shape, with a value of aspect ratio d/h being in a range of 1.5≤d/h≤20.

Advantage of the Invention

In the solar radiation shielding laminated structure according to the present invention, the intermediate film and/or laminated sheet includes solar radiation shielding fine particles containing calcium lanthanum boride having a predetermined structure, has high transmission performance in the visible light region, is less colored, has low haze, and, at the same time, has high solar radiation shielding property and excellent weather resistance.

DETAILED DESCRIPTION OF THE INVENTION

Figure 1:
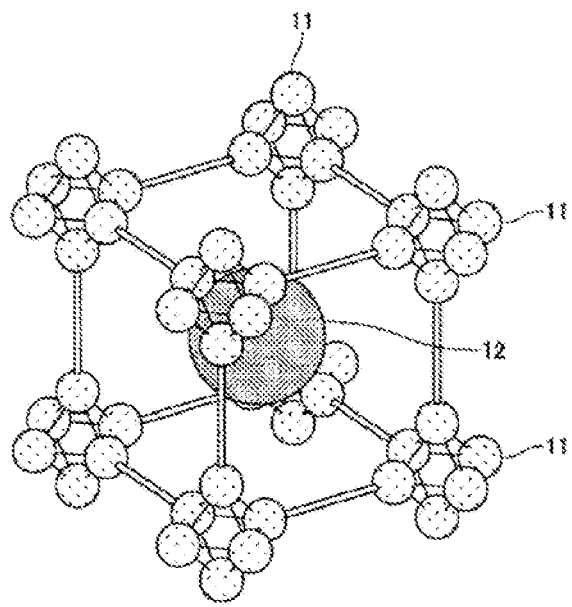
FIG. 1 is a schematic view illustrating a crystal structure of hexaboride.

In a solar radiation shielding laminated structure according to the present invention in which an interlayer is sandwiched between two laminated sheets, solar radiation shielding fine particles containing calcium lanthanum boride fine particles are contained in the intermediate film and/or laminated sheet; the interlayer having, as an intermediate film, one or more kinds selected from a resin sheet and a resin film, the two laminated sheets being selected from a sheet-glass and a resin board. The solar radiation shielding laminated structure according to the present invention has high transmission performance in the visible light region, is less colored, has low haze, and, at the same time, has excellent solar radiation shielding property and stable weather resistance (oxidation resistance, water resistance, moisture resistance, UV resistance).

Hereinafter, embodiments of the solar radiation shielding laminated structure will be described in the following order: [A] Solar radiation shielding fine particles, [B] Method for producing solar radiation shielding fine particles, and [C] Solar radiation shielding laminated structure and method for production thereof.

[A] Solar Radiation Shielding Fine Particles

The solar radiation shielding laminated structure according to the present invention contains, as solar radiation shielding fine particles, calcium lanthanum boride fine particles represented by general formula $Ca_xLa_{1-x}B_m$ (wherein 0.001≤x≤0.800, 5.0≤m<6.3).

Further, in the case where the solar radiation shielding fine particles are contained in two or more of the above-described intermediate film and laminated sheet for the purpose of improving the solar radiation shielding property and the visible light transmission property, changing a wavelength width of an absorption peak, adjusting color tone of the solar radiation shielding laminated structure, reducing an amount of an added filler, and the like, at least one layer contains the solar radiation shielding fine particles containing the calcium lanthanum boride fine particles while at least one of the other layers contains solar radiation shielding fine particles having solar radiation shielding property different from that of the calcium lanthanum boride fine particles. Details will be described later.

Therefore, the solar radiation shielding fine particles according to the present invention will be described in the following order: [a] Calcium lanthanum boride fine particles, and [b] Solar radiation shielding fine particles having solar radiation shielding property different from that of calcium lanthanum boride fine particles described in [a].

[a] Calcium Lanthanum Boride Fine Particles

Hereafter, the calcium lanthanum boride fine particles according to the present invention will be described in detail in the following order: (1) Crystal structure, (2) Ca content [x: 0.001≤x≤0.800], (3) B (boron) content [5.0≤m<6.3], (4) Shape of fine particles, (5) Average dispersed particle size of fine particles, and (6) Surface treatment of fine particles.

(1) Crystal Structure

A crystal structure of hexaboride (general formula $MB_6$) is shown in FIG. 1.

As illustrated in FIG. 1, the hexaboride has a cubic system and a simple cubic structure, and an octahedron formed of six boron atoms 11 is arranged at each vertex of the cube. Then, an element M12 is disposed in a central space surrounded by eight octahedrons formed of boron atoms 11.

As described above, the calcium lanthanum boride according to the present invention is represented by general formula $Ca_xLa_{1-x}B_m$ (satisfying 0.001≤x≤0.800, 5.0≤m<6.3). In $Ca_xLa_{1-x}B_m$ fine particles, similarly to its terminal compositions, $CaB_6$ (wherein x=1, m=6) and $LaB_6$ (wherein x=0, m=6), space group Pm (−3) m and Bravais lattice has a crystal structure which is a simple cubic structure. Ca or La atom is disposed at the body-center position, and an octahedron of six B atoms is disposed at the corner position.

Conventionally known $LaB_6$ is a metal compound having a large amount of free electrons and when miniaturized to a state of nano-sized fine particles, external electromagnetic waves can be resonantly absorbed due to localized surface plasmon resonance of free electrons. Therefore, the solar radiation shielding effect of $LaB_6$ applies this principle.

On the other hand, the present inventors made intensive studies and found an effect of substituting La position in $LaB_6$ with an alkaline earth element of group-II elements.

Then, it is found that calcium lanthanum boride fine particles represented by general formula $Ca_xLa_{1-x}B_m$ (satisfying $0.001 \leq x \leq 0.800$, $5.0 \leq m < 6.3$) wherein La is partially substituted with Ca which is the alkali earth element, has an effect of dramatically improving a visible light transmission property according to an addition amount of Ca while maintaining a high infrared absorption effect.

(2) Ca Content [x: $0.001 \leq x \leq 0.800$]

In the calcium lanthanum boride $[Ca_xLa_{1-x}B_m]$ fine particles according to the present invention, Ca is completely dissolved at La position. However, it is important that Ca content x be in a range of $0.001 \leq x \leq 0.800$. When the Ca content x is greater than 0.001, the effect of improving the visible light transmittance becomes apparent. On the other hand, when x is 0.800 or less, the effect of improving the visible light transmittance, which is substantially different from $CaB_6$, is a clear characteristic of the present invention. Thus, the effect of the present invention can be obtained.

A more preferable composition for sufficiently obtaining a height of the visible light transmission property which is the effect of the present invention is as follows: the Ca content x is in a range of $0.100 \leq x \leq 0.625$. This is because in this composition range, an improvement effect of suppressing green coloration is remarkable, and at the same time, sufficient infrared absorption property can be exhibited in a coating layer in which the calcium lanthanum boride fine particles are contained and dispersed.

The calcium lanthanum boride fine particles according to the present invention also has a preferable constitution in which two or more calcium lanthanum boride fine particles having compositions with different values of Ca content x are used in combination. This is because calcium lanthanum boride fine particles having different values of Ca content x have different absorption wavelengths. Accordingly, there is an effect of substantially broadening an absorption peak wavelength when mixing fine particles having different x values.

The detailed reason is not clear, but experiments indicate that particularly, when fine particles substituted with Ca:La=1:3 (i.e., x=0.25) and fine particles substituted with Ca:La=3:1 (i.e., x=0.75) are mixed in various proportions, a near-infrared radiation shielding layer is formed in which transmission property in the visible range and absorptivity of near-infrared radiations are well-balanced.

The calcium lanthanum boride fine particles according to the present invention may contain some unavoidable impurities in a range of allowing usual industrial implementation. For example, a small amount of an element such as Ce, Pr, Nd, Gd, Tb, Dy, Ho, Y, Sm, Eu, Er, Tm, Yb, Lu, and Sr may be contained, as an impurity to be substituted at La position. Further, a small amount of an element such as C, N or O may be contained, as an impurity to be substituted at B (boron) position. Furthermore, the impurities may be contained to such an extent that they are introduced in small amounts in other conventional industrial production processes.

According to the results of preparing the $CaB_6$ fine particle dispersion body and performing optical absorption measurement, it has surface plasmon resonance absorption in a mid-infrared region, and has semi-metal properties with very low free electron concentration.

Further, in the calcium lanthanum boride, Ca completely dissolves at La position. The change in an absorption wavelength caused by addition of Ca in the calcium lanthanum boride was investigated. Then, in the case of a fine particle group having a particle shape that is approximated to a spherical shape on average, the absorption wavelength gradually extends to a longer wavelength side from about 600 nm for $LaB_6$ fine particles to about 3200 nm for $CaB_6$ fine particles, which is caused by increase of Ca.

However, it is found that the change in the absorption wavelength is not uniform, and smaller on La-rich side, suddenly increases on Ca-rich side.

Namely, when the calcium lanthanum boride fine particles are approximated to spherical particles, the plasma absorption wavelength becomes longer by about 200 nm from around 600 nm to around 800 nm in the composition range where the value x of the Ca content is $0.0 \leq x \leq 0.5$. On the other hand, it is found that where the value x of the Ca content is $0.5 \leq x \leq 1.0$, the rate of change of the plasma absorption wavelength rapidly increases, and the plasma absorption wavelength changes by about 2400 nm, from about 800 nm to about 3200 nm.

Further, in an intermediate composition of the calcium lanthanum boride with Ca added thereto, reduction of a blue side transmittance, which may contribute to strong green coloration of $LaB_6$ described above, is improved. Particularly, it is found that in the composition range where the value x of the Ca content is $0.5 \leq x \leq 0.8$, a green color tone becomes lighter and changes toward a neutral color tone, which is very useful for practical use.

A mechanism of the effect of improving the visible light transmission property by adding Ca to $LaB_6$ will be described hereafter.

In non-patent document 1, the present inventors reveal that the visible light transmission property and the cause of coloration of $LaB_6$ can be understood from its electronic structure.

Namely, since a $MB_6$ material based on group-III elements including $LaB_6$ (wherein M is an element selected from Sc, Y, La and Ac) has a wide gap electronic structure at a point other than a F point and X point in the Brillouin zone, transmission property should be basically high. Meanwhile the gap is narrow at the F point, and a free electron-like bands overlap with the lower part of the conduction band and the upper part of the valence band and extend across therebetween at the point X, and such a state can be a cause of low energy electron transitions, i.e., deep coloration. However, the upper part of the valence band is mainly boron 2p orbital, and the lower part of the conduction band is a hybrid orbital of La 5d orbital and boron 2p orbital. Therefore, it is found that Fermi's golden rule greatly reduces a transition probability of electrons, causing visible light transmission property.

Based on the above findings, the present inventors further studied the effect of improving the visible light transmission property by addition of other elements to $LaB_6$.

As a result, it is found that in $SrB_6$ and $BaB_6$ based on group-II elements as additive elements, each 3d and 4d electrons form a hybrid orbital with boron 2p electrons to similarly produce visible light transmission property. However, it is newly revealed that in the case of $CaCaB_6$, although it is the group-II element, energy of the boron 2p electrons in the valence electron band is relatively low and a band gap formed with Ca-3d orbitals becomes relatively wider, thereby giving a distribution form of electronic transition slightly different from that of the ordinary d-p type.

Based on the above new finding, the present inventors conceive that in the calcium lanthanum boride according to the present invention, the improvement in the visible light transmission property of $LaB_6$ by addition of Ca is attributed to the hybrid band of Ca-3d and B (boron)-2p orbitals around the X point.

Now, a relationship between infrared absorption by plasma absorption and visible light transmission property in the calcium lanthanum boride according to the present invention will be described.

In general, the intensity of plasma absorption decreases with the decrease of a free electron density. In the calcium lanthanum boride, an amount of the free electrons decreases with the decrease of La, and therefore an absorption peak tends to be smaller as the value x of the Ca content is larger. On the other hand, the visible light transmittance increases as the value x of the Ca content increases, and therefore more calcium lanthanum boride fine particles can be introduced into a layer. Namely, in an actual calcium lanthanum boride fine particle dispersed layer, the abundance of the fine particles has an effect of compensating for the decrease of the intensity of plasma absorption. As a result, when the calcium lanthanum boride fine particles are considered as a transparent solar radiation shielding material, properties thereof are determined by a balance between intensity of plasma absorption and intensity of the visible light transmittance. Accordingly, even in a case of the calcium lanthanum boride fine particles having high Ca content, it is found that the transmittance can be large at visible wavelengths, and a strong solar radiation shielding effect can be exhibited.

(3) B (Boron) Content [$5.0 \leq m < 6.3$]

In the calcium lanthanum boride $Ca_xLa_{1-x}B_m$ (satisfying $0.001 \leq x \leq 0.800$) fine particles according to the present invention, elements Ca and La are collectively referred to as M element. Then, it is important that the atomic number ratio m of B (boron) to one atom of M element obtained by chemical analysis of the powder containing the boride fine particles is $5.0 \leq m < 6.3$.

Examples of the fine particles of borides represented by general formula $MB_m$ include borides represented by $MB_4$, $MB_6$, $MB_{12}$, etc. For the boride fine particles for shielding against solar radiation, it is important that the value of the atomic ratio m of B (boron) is in a range of $5.0 \leq m < 6.3$.

In the case where $m \geq 5.0$, generation of MB, $MB_2$ and the like is suppressed, and the solar radiation shielding property is improved. On the other hand, when satisfying $m < 6.3$, generation of boron oxide particles other than boride fine particles is suppressed. The boron oxide fine particles are hygroscopic. Therefore, when the boron oxide particles are mixed in the boride powder, the moisture resistance of the boride powder will be reduced, and the deterioration of the solar radiation shielding properties will become large over time. Therefore, it is preferable to suppress the generation of boron oxide particles, by setting the value of m to satisfy $m < 6.3$.

In view of the foregoing, it is important that among the above-described borides, $MB_6$ is mainly contained in the boride fine particles for shielding against solar radiation, but $MB_4$ and $MB_{12}$ may also be partially contained.

In a case of producing the above-described boride fine particles, when the wet analysis is performed, the value of the atomic number ratio value m of B (boron) actually fluctuates slightly from 6 and may contain a slight amount of other phases. According to X-ray diffraction and TEM observation, these phases are $LaBO_3$ and $B_2O_3$, which are considered to be produced as reaction products when the raw material absorbs moisture in the air. In any case, it is important that the main body of the solar radiation shielding effect is $MB_6$ fine particles, and the value of m satisfies $5.0 \leq m < 6.3$, including a composition fluctuation of the boride fine particles themselves.

(4) Shape of Fine Particles

The shape of each calcium lanthanum boride fine particles which are solar radiation shielding fine particles according to the present invention are approximately a disc, a flat cylindrical, a flat, a pancake, or a flat disc-like spheroidal.

Specifically, the fine particle shape of the calcium lanthanum boride fine particles satisfies at least one of the following 1), 2):

1) a shape in which a scattering intensity of the calcium lanthanum boride fine particles diluted and dispersed in a solvent measured using a small-angle X-ray scattering method is such that a slope value Ve of a straight line obtained by double-logarithmic plotting of a relationship between scattering vector $q = 4\pi \sin \theta / \lambda$ and scattering intensity I(q) is in a range of $-3.8 \leq Ve \leq -1.5$;

2) a flat cylindrical (wherein a diameter of a bottom circle is d and a height of a cylinder is h) shape, or a spheroidal (wherein a length of a long axis is d and a length of a short axis is h) shape, with a value of aspect ratio d/h being in a range of $1.5 \leq d/h \leq 20$.

Preferable shapes of 1) and 2) of the calcium lanthanum boride fine particles will be described more specifically hereafter.

Preferred Shape of 1)

In the shape, a scattering intensity of the calcium lanthanum boride fine particles diluted and dispersed in a solvent measured using a small-angle X-ray scattering method is such that a slope value Ve of a straight line obtained by double-logarithmic plotting of a relationship between scattering vector $q = 4\pi \sin \theta / \lambda$ and scattering intensity I(q) is in a range of $-3.8 \leq Ve \leq -1.5$, and more preferably $-3.8 \leq Ve \leq -2.0$.

Here, the measurement by the small-angle X-ray scattering method described above is performed in the case where the scattered X-rays are observed at a position of an angle 2θ from the incident X-rays incident on the fine particles. There is an optical path difference in the scattered X-rays passing through two points separated by r in the fine particle, and a phase difference is denoted as r·q using the scattering vector q (defined by a difference of the wave number vector between the incident X-ray and that of the scattered X-ray).

First, the x-ray small-angle scattering used to define the shape of the calcium lanthanum boride fine particles according to the present invention will be described.

Small-angle X-ray scattering is a method of measuring scattered X-rays having a scattering angle of several degrees or less.

When a wavelength of X-rays is denoted as λ and a scattering angle is denoted as 2θ, the scattered X-rays having smaller scattering angles is measured from Bragg's law $\lambda = 2d \sin \theta$. Therefore, such a measurement corresponds to a measurement of a large structure in real space.

In addition, measurement of the scattered X-rays having different scattering angles by the small-angle X-ray scattering method, corresponds to observation of a substance with different spatial resolutions.

Namely, coarse-grained structural information can be obtained from the scattered X-rays having a small scattering angle, and structural information with higher spatial resolution can be obtained from the scattered X-rays having a large scattering angle.

Specifically, when a scatterer is particulate, the scattering is observed as follows. As the scattering angle $2\theta$ or the scattering vector ($q=4\pi \sin \theta/\lambda$) decreases, scattering corresponding to structural information observed at a larger scale is observed such as the structure of atoms and molecules in particles, the structure of particle surfaces (smoothness and density profile), the shape of particles, and the size of particles.

On the other hand, since scattering intensity $I(q)$ is obtained by the Fourier transform of the autocorrelation function of the electron density distribution, the scattering function of the scatterer having an arbitrary shape can be specifically calculated. The square of a scattering amplitude of this scattering function is the scattering intensity.

Here, when the scattering intensity is calculated in a case of the scatterer having an extreme shape such as a sphere, an infinitely thin and long rod, an infinitely thin disc, an exponential law is established for the scattering intensity $I(q)$ and the scattering vector q.

Accordingly, rough shape information of the scatterer can be obtained by double-logarithmic-plotting the scattering intensity $I(q)$ and the scattering vector q to obtain the slope of the plot. Specifically, in the case of the above-described extreme shape, the slope of the plot is known as follows. In the case of a sphere: the slope is $-4$; in the case of an infinitely thin and long rod: the slope is $-1$; and in the case of an infinitely thin disc: the slope is $-2$.

As described above, the fine particle shape of the calcium lanthanum boride fine particles according to the present invention is considered as follows. The fine particle shape of the calcium lanthanum boride fine particles can be evaluated by measuring the scattering intensity of the fine particles diluted and dispersed in IPA using the small-angle X-ray scattering method described above, then double-logarithmic-plotting the relationship between the scattering intensity $I(q)$ and the scattering vector q, and calculating the slope of the plot.

On the other hand, as well known, a resonance wavelength is changed according to the particle shape, due to a localized surface plasmon resonance effect. In general, in the case of a spherical shape, an absorption wavelength is obtained at a shortest wavelength. In the case where the particle shape is changed from spherical shape to disc-like (wherein long axis length is a=b and short axis length is c), the absorption wavelength shifts to a long wavelength side, and simultaneously the absorption wavelength splits into a short wavelength peak corresponding to resonance on the short axis and a long wavelength peak corresponding to resonance on the long axis.

Further, in the case of the disc-like fine particles, the short wavelength peak corresponding to the resonance on the short axis is relatively smaller than the long wavelength peak corresponding to the resonance on the long axis. When this effect is summed up for a group of fine particles existing by a number comparable to the Avogadro number, the short wavelength peak disappears, and the long wavelength peaks become one large broad peak. Accordingly, from a near infrared absorption performance, the disc-like fine particles are preferable because the plasmon resonance wavelength is shifted to the longer wavelength side and larger near-infrared absorption can be obtained, as compared with the case of the spherical fine particles.

On the other hand, in the case of the rod-like (thin and long rod-like) fine particles, since the short wavelength peak corresponding to the resonance on the short axis becomes relatively strong, the absorption peak splits into the short wavelength peak and the long wavelength peak corresponding to the resonance on the long axis. When this effect is observed for a huge number of fine particles comparable to the Avogadro's number, such a split state remains, and such a state is not desired for the solar radiation shielding layer according to the present invention because an object of the present invention is to overcome problems by controlling the optical response clearly separately between the visible light transmission property and the near infrared absorption property.

As described above, from the relationship between the calcium lanthanum boride fine particles and the resonance wavelength of their localized surface plasmon resonance, the present inventors achieve a preferable form of the calcium lanthanum boride fine particles according to the present invention.

Specifically, the present inventors found that when the scattering intensity of the fine particles dispersed in a solvent is measured using the small-angle X-ray scattering method, it is important that a slope value Ve of a straight line obtained by double-logarithmic plotting of a relationship between scattering vector $q=4\pi \sin \theta/\lambda$ and scattering intensity $I(q)$ is in a range of $-3.8 \leq Ve \leq -1.5$, and more preferably $-3.8 \leq Ve \leq -2.0$.

When the slope Ve described above is $-3.8$ or more, the fine particle shape of the calcium lanthanum boride fine particles does not become spherical, and a collective effect of shape anisotropy increases. Therefore, the bandwidth of the plasmon absorption becomes wider and the near-infrared absorption effect is increased.

On the other hand, when the slope Ve is $-1.5$ or less, the fine particle shape of the calcium lanthanum boride fine particles does not become rod-shape (needle-shape, bar-shape). Therefore, the resonance in the long axis direction becomes strong and the resonance in the short axis direction becomes weak. In addition, the splitting of the resonant wavelength does not become remarkable and the near-infrared absorption effect is increased. Further, since the resonance wavelength in the short axis direction is out of the visible light region, the visible transmission does not decrease, thereby not causing coloration (layer coloration).

Preferred Shape of 2)

A preferable shape of 2) of the calcium lanthanum boride fine particles is a flat cylinder (wherein a diameter of a bottom circle is d and a height of a cylinder is h), or a spheroid (wherein, a length of a long axis is d and a length of a short axis is h). In the flat cylinder or the spheroid, it is important that the aspect ratio d/h is $1.5 \leq d/h \leq 20$.

The present inventors found that in non-patent document 2, when $LaB_6$ nano-sized fine particles are a group including disc-like fine particles having various d/h values (wherein d is the long axis length and h is the short axis length), the plasmon absorption bandwidth actually becomes seven times or more wider than the plasmon absorption bandwidth of a group of uniformly spherical $LaB_6$ nano-sized fine particles.

As a result, in the case of the disc-like calcium lanthanum boride fine particles having a composition of Ca content x according to the present invention, the peak of the absorption wavelength is characteristically shifted toward longer wavelength side by several hundreds nm compared to that of spherical fine particles in accordance with the ratio d/h of the disc shape (d is long axis length and h is short axis length).

Accordingly, it is important to make corrections for the disc-like calcium lanthanum boride fine particles, in consideration of a shape factor of shaping into the above-described optimum elemental composition.

Specifically, it is preferable that the calcium lanthanum boride fine particles according to the present invention are disc-like fine particles, and the aspect ratio d/h is preferably $1.5 \leq d/h \leq 20$ in the flat cylinder (wherein d is a diameter of a bottom circle and h is a height of a cylinder) or in the spheroid (wherein d is a length of a long axis and h is a length of a short axis).

With the fine particle shape in the above range, the calcium lanthanum boride fine particles according to the present invention have sufficient properties as a heat ray shielding material which widely shields a heat ray component contained in the sunlight, and can improve the visible light transmittance compared to the conventionally known heat ray shielding material.

The reason is as follows. When the aspect ratio d/h is less than 1.5, the fine particle shape of the calcium lanthanum boride fine particles becomes a thin cylinder shape (close to rod-like, bar-like). Accordingly, the near-infrared absorption effect is reduced similarly to the above-described case of Ve>−1.5 and the visible light transmittance is also reduced, undesirably causing coloration (layer coloration).

On the other hand, the aspect ratio d/h exceeding 20 provides large absorption in the near-infrared region. However, if the value of h represents a feasible thickness, d should be large and thereby the particle size should be very large. As a result, increased haze and decreased visible light transmission property become problematic. Conversely, when the value of d is reduced to a level free from concern about haze, h should be correspondingly decreased. However, a thickness as thin as 0.1 nm cannot be attained due to a limit on thinning of the particle. Therefore, d/h exceeding 20 cannot be attained.

(5) Average Dispersed Particle Size of Fine Particles

An average dispersed particle size of the calcium lanthanum boride fine particles according to the present invention is preferably 800 nm or less. This is because when the average dispersed particle size is 800 nm or less, it is possible to secure the visibility of the visible light region and secure the transparency at the same time without completely shielding the light due to scattering, in the case where the calcium lanthanum boride fine particles are contained in a calcium lanthanum boride fine particle dispersion body described later. In the present invention, the average dispersed particle size of the calcium lanthanum boride fine particles refers to a value obtained by measuring the average dispersed particle size of the calcium lanthanum boride fine particles in the dispersion liquid by a dynamic light scattering method (FFT-power spectrum method). In the present invention, the average dispersed particle size may be simply referred to as an "average particle size".

In the calcium-lanthanum boride fine particles according to the present invention, particularly, when the transparency of the visible light region is focused, it is preferable to also consider the reduction of scattering due to the calcium lanthanum boride fine particles.

If the reduction of scattering due to the calcium lanthanum boride fine particles is taken into consideration, the average dispersed particle size is preferably 100 nm or less. The reason is as follows. In the calcium lanthanum boride fine particle dispersion liquid and a calcium lanthanum boride particle dispersion body described later, if the average dispersed particle size of the fine particles is small, scattering of light in the visible light region in the wavelength range from 400 nm to 780 nm due to geometric scattering or Mie scattering is reduced. As a result of the scattering of the light being reduced, it is possible to prevent the fine particle dispersion body from becoming like frosted glass and losing clear transparency.

This is because when the average dispersed particle size of the calcium lanthanum boride fine particles is 100 nm or less, the above-described geometrical scattering or Mie scattering is reduced, and the Rayleigh scattering is dominant in the region. In the Rayleigh scattering region, the scattered light is proportional to the sixth power of the particle size, and therefore as the average dispersed particle size of the fine particles decreases, the scattering is reduced, and the transparency is improved. Further, when the average dispersed particle size of the calcium lanthanum boride fine particles is 50 nm or less, the scattered light is extremely reduced, which is particularly preferable. From a viewpoint of avoiding light scattering, it is preferable that the average dispersed particle size of the calcium lanthanum boride fine particles be smaller, and industrial production is not difficult so long as the average dispersed particle size is 1 nm or more.

(6) Surface Treatment of Fine Particles

The calcium lanthanum boride fine particles basically have very stable properties against UV light and sunlight as a characteristic of inorganic materials. Namely, there is almost no change in the material properties upon irradiation with UV light or sunlight, and almost no deterioration of color or functions occurs. Further, a crystal structure in which La and Ca ions are surrounded by a basic frame of strongly and covalently bonded $B_6$ octahedron is very stable, Therefore, even nano-sized fine particles have sufficient practical resistance to moisture, UV and moisture co-attack. As a result, basically, it can be said the calcium lanthanum boride fine particles have extremely stable weather resistance (oxidation resistance, water resistance, moisture resistance, UV resistance).

Further, if the surface of the calcium lanthanum boride fine particles is covered with a surface covering layer containing silicon compound, titanium compound, zirconium compound, aluminum compound, more specifically, an oxide and/or nitride containing one or more elements selected from silicon, titanium, zirconium, and aluminum, the weather resistance and chemical resistance of the fine particles can be further improved. In addition, in order to cover the calcium lanthanum boride fine particles with a surface covering layer containing silicone compound, it is beneficial to use silane compound.

On the other hand, in the calcium lanthanum boride fine particles according to the present invention, it is preferable that a surface is not oxidized, but usually it is often slightly oxidized. Although a detailed composition of the oxidized surface is unknown, a phase in which La and Ca elements are slightly contained in amorphous boron oxide $B_2O_3$ is considered to have an outermost surface property.

Further, in a dispersion step of calcium lanthanum boride fine particles described later, it is inevitable that oxidation of the particle surface occurs to some extent. However, even in this case, an ability to cause plasmon resonance is maintained within the particle, and therefore the effectiveness of exhibiting a near-infrared shielding effect is maintained. Accordingly, for example, even calcium lanthanum boride fine particles whose surface is oxidized can be used as the calcium lanthanum boride fine particles according to the present invention.

Further, in the calcium lanthanum boride fine particles according to the present invention, the higher a crystal perfection, the greater the near-infrared shielding effect. However, even the particles having low crystallinity and exhibiting a broad diffraction peak by X-ray diffraction produce a near-infrared shielding effect as long as the basic bond inside the fine particles is formed by bonding each metal element to the hexaboride skeleton. Therefore, such calcium lanthanum boride fine particles can be used in the present invention.

[b] Solar Radiation Shielding Fine Particles Having Solar Radiation Shielding Property Different from that of Calcium Lanthanum Boride Fine Particles Described in [a].

As the solar radiation shielding fine particles having solar radiation shielding function different from that of the calcium lanthanum boride fine particles described above, at least one kind of solar radiation shielding fine particles is selected from calcium lanthanum boride fine particles having solar radiation shielding function different from that of the above-described calcium lanthanum boride fine particles, hexagonal crystal tungsten bronze fine particles, Sn-doped indium oxide fine particles, Sb-doped tin oxide fine particles, Al-doped zinc oxide fine particles, and Ga-doped zinc oxide fine particles. Particularly, from a viewpoint of improvement in solar radiation shielding properties, hexagonal crystal tungsten bronze fine particles and Sn-doped indium oxide fine particles are preferred.

Explanation will be given hereafter in the following order: (1) Calcium lanthanum boride fine particles having solar radiation shielding function different from that of the calcium lanthanum boride fine particles described in [a], (2) Hexagonal crystal tungsten bronze fine particles, (3) Sn-doped indium oxide fine particles, Sb-doped tin oxide fine particles, (4) Al-doped zinc oxide fine particles, Ga-doped zinc oxide fine particles.

(1) Calcium Lanthanum Boride Fine Particles Having Solar Radiation Shielding Function Different from that of the Calcium Lanthanum Boride Fine Particles Described in [a]

As described in [a], in the calcium lanthanum boride $[Ca_xLa_{1-x}B_m]$ fine particles according to the present invention, when the Ca content x is in a range of $0.001 \leq x \leq 0.800$ and the Ca content x is greater than 0.001, the effect of improving the visible light transmittance becomes apparent. On the other hand, when x is 0.800 or less, the effect of improving the visible light transmittance, which is substantially different from $CaB_6$, is a clear characteristic of the present invention. Thus, the effect of the present invention can be obtained. Therefore, as the calcium lanthanum boride fine particles having the solar radiation shielding function different from that of the calcium lanthanum boride fine particles, the calcium lanthanum boride fine particles having compositions with different values of Ca content x within the above-described composition range can be selected.

In this case, the calcium lanthanum boride fine particles have absorption wavelength different from that of the calcium lanthanum boride fine particles having different solar radiation shielding function. By combining them, effect of widening the width of the absorption peak wavelength can be substantially obtained. Further, an improvement effect is also observed in which green coloration caused by the calcium lanthanum boride fine particles is suppressed.

(2) Hexagonal Crystal Tungsten Bronze Fine Particles

The hexagonal crystal tungsten oxide fine particles are preferably represented by general formula $M_xWO_3$ (wherein, M element is an element of one or more selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x \leq 1$).

Regarding the value x which represents an addition amount of element M, when the value of x is more than 0.001, a sufficient amount of free electrons are generated, and a targeted infrared absorption properties can be obtained. Then, as the addition amount of the element M increases, the supply amount of the free electrons increases and the infrared shielding efficiency also increases, but the effect is saturated when the value of x is about 1. Further, when the value of x is less than 1, generation of an impurity phase in the infrared shielding material can be avoided, which is preferable. The element M is preferably one or more kinds selected from H, He, alkali metals, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I. In $M_xWO_3$ to which the element M is added, the element M is more preferably one or more kinds selected from alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, and Re from a viewpoint of stability; and still more preferably, the element M belonging to an alkaline earth metal element, transition metal element, 4B group element, or 5B group element from a viewpoint of improving optical properties and weather resistance as an infrared shielding material.

Further, when each composite tungsten oxide fine particles described above has a hexagonal crystal structure, transmittance of the fine particles in the visible light region is improved and absorption property in the near-infrared region is improved. A hexagonal void is formed by assembling six octahedrons formed by units of $WO_6$. Then, the M element is arranged in the void to constitute one unit, and a large number of these units gather to form a hexagonal crystal structure.

In order to improve the transmittance in the visible light region and improve the absorption property in the near-infrared region, it is sufficient that the above-described unit structure (a structure in which six octahedrons formed of $WO_6$ units are assembled to form a hexagonal void, and element M is arranged in the void) may be included in the composite tungsten oxide fine particles, and the composite tungsten oxide fine particles may be crystalline or amorphous.

When the cation of the element M is added to the hexagonal void, the transmittance in the visible light region is improved and the absorption property in the near-infrared region is improved. Generally, when the element M having a large ion radius is added, the hexagonal crystal is formed. Specifically, when Cs, Rb, K, Tl, Ba, In, Li, Sn, Ca, Sr, or Fe is added, the hexagonal crystal is easily formed, which is preferable. Of course, the elements other than these have no problem. Because with such elements, the additive element M can exist in the hexagonal voids formed in units of $WO_6$.

When each composite tungsten oxide fine particles having the hexagonal crystal structure has a uniform crystal structure, the addition amount of the additive element M is preferably 0.2 or more and 0.5 or less, and more preferably 0.33 in terms of the value of x. When the value of x is 0.33, it is considered that the additive element M is arranged in all the hexagonal voids.

Since hexagonal crystal tungsten bronze fine particles greatly absorb light in the near-infrared region, particularly around the wavelength of 1000 nm, and thus their transmission color tone is frequently blue to green. Further, the particle size of the infrared shielding material can be selected depending on the intended use. First, when used for applications while maintaining transparency, it is preferable to have a particle size of 800 nm or less. It is because particles with particle size smaller than 800 nm can maintain the visibility in the visible light region without completely shielding light due to scattering, and at the same time efficiently maintain the transparency. Particularly, when the transparency of the visible light region is focused, it is preferable to also consider the scattering due to particles.

When the reduction of the scattering due to the particles is focused, the suitable particle size is 200 nm or less, preferably 100 nm or less. The reason is as follows. With small particle size, scattering of the light with wavelength from 400 nm to 780 nm in the visible light region due to geometric or Mie scattering is reduced, and thereby the infrared shielding layer can be avoided from becoming like fogged glass and losing clear transparency. Namely, particle size of 200 nm or less corresponds to Rayleigh scattering region, with the above-described geometric scattering or Mie scattering being reduced. In the Rayleigh scattering region, the scattered light is in proportion to the sixth power of the particle size. Therefore, with the decrease of the particle size, the scattering is reduced, and the transparency is improved. In addition, when the particle size is 100 nm or less, the scattered light extremely decreases, which is preferable. From the viewpoint of avoiding light scattering, the smaller dispersed particle size is more preferable. When the particle size is 1 nm or more, industrial production is easy.

(3) Sn-Doped Indium Oxide Fine Particles, Sb-Doped Tin Oxide Fine Particles

Sn-doped indium oxide fine particles and Sb-doped tin oxide fine particles hardly absorb or reflect light in the visible light region, and have large reflection and absorption derived from plasma resonance in the wavelength region of 1000 nm or more. In these transmission profiles, the transmittance decreases toward the longer wavelength side in the near-infrared region. On the other hand, in the transmission profile of the calcium lanthanum boride fine particles according to the present invention, the local minimum value is around the wavelength of 1000 nm, and the transmittance gradually increases on the longer wavelength side. Therefore, the calcium lanthanum boride fine particles can be used in combination with Sn-doped indium oxide fine particles and/or Sb-doped tin oxide fine particles, utilizing the difference in the transmission profile. As a result, the heat rays in the near-infrared region can be shielded without decreasing the visible light transmittance, and the heat ray shielding property is improved as compared with the case of single use, which is preferable.

An average dispersed particle size of the calcium lanthanum boride fine particles to be used is preferably 200 nm or less. With the average particle size being 200 nm or less, the aggregation among the fine particles in the dispersion liquid does not become stronger, thereby not causing the sedimentation of the fine particles nor light scattering, and further the resin sheet does not appear cloudy. Similarly, in Sn-doped indium oxide fine particles and Sb-doped tin oxide fine particles, an average particle size of 200 nm or less is preferred from the same reason as described above. Light transmissive roofing materials may be required to have a translucent transmission property rather than transparency. In that case, a constitution in which an average particle size of the fine particle is increased to facilitate scattering is preferred. However, an average particle size of 200 nm or less is preferred from the viewpoint of securing the infrared absorption ability itself.

(4) Al-Doped Zinc Oxide Fine Particles, Ga-Doped Zinc Oxide Fine Particles

The Al-doped zinc oxide fine particles and Ga-doped zinc oxide fine particles have relatively low visible light reflectance and never give a glaring appearance. On the other hand, the plasma wavelength is on the relatively longer wavelength side and the reflection/absorption effect in the near-infrared region close to the visible light may not be sufficient in some cases. Therefore, similarly to the above-described Sn-doped indium oxide fine particles and Sb-doped tin oxide fine particles, they are preferably used in combination with the calcium lanthanum boride fine particles utilizing the difference in the transmission profile. As a result, the heat rays in the near-infrared region can be shielded without decreasing the visible light transmittance, and the heat ray shielding property is improved as compared with the case of single use, which is preferable.

[B] Method for Producing Solar Radiation Shielding Fine Particles

There are various methods for producing the calcium lanthanum boride fine particles contained in the solar radiation shielding fine particles according to the present invention.

Preferred examples of the method for producing the calcium lanthanum boride fine particles according to the present invention will be described in detail hereafter in the following order: (1) Solid phase reaction method, (2) CVD method, (3) Direct reaction method between elements, (4) Thermal plasma method, (5) Molten salt electrolysis method, other methods, and (6) Summary of production methods.

(1) Solid Phase Reaction Method

For example, the solid phase reaction method by $B_4C$ reduction described in non-patent document 3 and non-patent document 4 can be used with modification. According to the solid phase reaction method, oxide sources $La_2O_3$ and CaO are mixed with $B_4C$ and reacted at high temperature in vacuum or in an inert gas. Then, $Ca_xLa_{1-x}B_m$ can be obtained by a reducing action of $B_4C$.

However, since a firing temperature is as high as 1500° C. to 1600° C. in the solid phase reaction, the obtained $Ca_xLa_{1-x}B_m$ particles are coarsened. On the other hand, as described above, in order to use the calcium lanthanum boride fine particles in heat ray shielding applications, a particle size is required to be sufficiently smaller than a visible light wavelength. Therefore, it is important that the coarsened calcium lanthanum boride fine particles be finely strongly pulverized into nano-sized fine particles by a mechanical method using a jet mill, a ball mill, an attritor, a bead mill, a paint shaker, or the like.

However, in the production of $Ca_xLa_{1-x}B_m$ by the solid phase reaction method, homogenization is relatively difficult. Accordingly, for example, in the production of $Ca_xLa_{1-x}B_m$, $CaB_6$ and $LaB_6$ may be separated locally, as compared to a case of simply producing $CaB_6$ or $LaB_6$. Therefore, it is found to be quite difficult for Ca and La with different valences to uniformly occupy a body-centered position of a simple cubic lattice formed by $B_6$ octahedrons. Accordingly, in a case of using the solid phase reaction method, it is preferable to keep the temperature as high as possible for a long time during firing.

On the other hand, using sodium borohydride $NaBH_4$ as the B (boron) raw material is also a preferable configuration as another method in the case of using the solid phase reaction method.

NaBH$_4$ not only provides a boron source, but also is decomposed as follows: NaBH$_4$ (s)→NaH (s)+BH$_3$ (s) at 460° C., and BH$_3$ (s)→B (s)+H$_2$ (g) at 506° C. to form a gas phase.

As a result, elemental diffusion is significantly promoted and B diffusion is also promoted, and Ca$_x$La$_{1-x}$B$_m$ can be formed by Ca and La so as to uniformly occupy the body-centered position of a simple cubic lattice formed by B$_6$ octahedrons. With the configuration, the firing temperature can be set to 1300° C. or less.

Further, adding metal powder such as Mg in order to promote reduction in the solid phase reaction method is also a preferable configuration. A great heat of reaction produced by the reduction reaction in the above configuration also has the effect of promoting the reaction of producing Ca$_x$La$_{1-x}$B$_m$.

(2) CVD Method

The calcium-lanthanum boride fine particles according to the present invention can also be obtained by a CVD (Chemical Vapor Deposition) method. This method is a method in which hydrogen reduction of metal halides gives borides.

Specifically, as a compound containing La or Ca, for example, LaCl$_3$ (lanthanum chloride) or CaCl$_2$ (calcium chloride) can be suitably used. As a compound containing boron, for example, BCl$_3$ (boron trichloride) can be suitably used.

The above raw materials and hydrogen gas and nitrogen gas are introduced into a reaction furnace and heated to a high temperature, and then boron trichloride gas is introduced and reacted.

LaB$_6$ single crystal or CaB$_6$ single crystal may be used as a reaction substrate. A deposited Ca$_x$La$_{1-x}$B$_m$ can be stripped from the substrate and washed to obtain calcium lanthanum boride particles. It is important that the obtained calcium lanthanum boride particles be more strongly pulverized into nano-sized fine particles by a mechanical method using a jet mill, a ball mill, an attritor, a bead mill, a paint shaker, or the like. Further, it is also possible to obtain nano-sized calcium lanthanum boride fine particles directly by adjusting CVD reaction conditions.

(3) Direct Reaction Method Between Elements

The calcium lanthanum boride fine particles according to the present invention can also be obtained by a direct reaction between elements. Namely, when calcium metal and lanthanum metal are reacted with boron at a high temperature of 1700° C. or more, boride of high purity can be obtained. However, the raw materials are very expensive, and therefore the above process is generally not industrial.

(4) Thermal Plasma Method

The calcium lanthanum boride fine particles according to the present invention can also be produced by a thermal plasma method. According to this method, it is possible to directly produce nano-sized fine particles by reacting raw materials in a thermal plasma reaction furnace. In the case of the thermal plasma method, it is characteristic that lattice defects are hardly introduced into fine particles, because the mechanical pulverization step required in the final step of the above-described method can be omitted. When the number of lattice defects is small, a relaxation time of free electrons is increased, and therefore there is an effect of making a near-infrared absorption wavelength shifted to a short wavelength side.

As the thermal plasma method, for example, any one of DC arc plasma, high-frequency plasma, microwave plasma, low frequency alternating current plasma, or superimposed plasma of them, or plasma generated by an electric method of applying a magnetic field to direct current plasma, plasma generated by irradiation with a high power laser, and plasma generated by high power electron beam or ion beam, can be used. Whichever thermal plasma method is used, a thermal plasma has a high temperature portion of 10000 to 15000 K. Particularly, it is preferably a plasma capable of controlling the time for generating the fine particles.

The raw material fed into the thermal plasma having the high temperature part is evaporated instantaneously in the high temperature part. Then, the evaporated raw material is condensed in the course of reaching a plasma tail flame part, and is rapidly solidified outside of the plasma flame, thereby producing the calcium lanthanum boride fine particles. A synthesis method will be described in detail with reference to FIG. 2 taking a case of using a high-frequency plasma reactor as an example.

Figure 2:
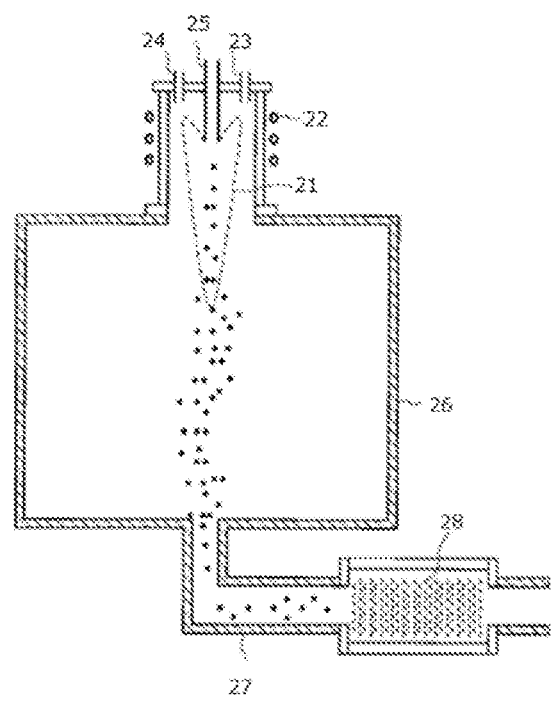
FIG. 2 is a conceptual view of one embodiment of a high frequency thermal plasma reactor used for producing the solar radiation shielding fine particles used in the present invention.

In the high frequency thermal plasma reactor illustrated in FIG. 2, first, an inside of a reaction system constituted by an inside of a water-cooled quartz double tube and an inside of a reaction vessel 26 is evacuated by an evacuation device, and thereafter the reaction system is filled with argon gas. Thereafter, any gas selected from argon gas, mixed gas of argon and helium (Ar—He mixed gas), or mixed gas of argon and nitrogen (Ar—N$_2$ mixed gas) is introduced as plasma gas into the reaction vessel from the plasma gas supply nozzle 24. On the other hand, Ar—He mixed gas is introduced from the sheath gas supply nozzle 23 as the sheath gas flowing immediately outside of the plasma region. Then, an alternating current is applied to a high frequency coil 22 to generate thermal plasma 21 by a high frequency electromagnetic field (for example, a frequency of 4 MHz).

Here, reaction is carried out for a predetermined time by introducing mixed powder as the raw material from a raw material powder supply nozzle 25 into thermal plasma, using argon gas supplied from a gas supply device (not shown) as carrier gas. After the reaction, the produced calcium lanthanum boride fine particles pass through a suction tube 27 and become deposited on a filter 28, and are collected.

The plasma gas has a function of keeping a thermal plasma region having a high temperature part of 10000 to 15000 K, and the sheath gas has a function of cooling an inner wall surface of a quartz torch in the reaction vessel and preventing melting of the quartz torch. Further, the plasma gas and the sheath gas affect a shape of the plasma region, so a shape control of the plasma region can be performed by adjusting a flow rate of these gases. Further, it is important to control the generation time of the generated fine particles by adjusting a flow rate of the carrier gas and a supply rate of the raw material.

(5) Molten Salt Electrolysis Method, Other Methods

Calcium lanthanum boride fine particles can be synthesized also by molten salt electrolysis, combustion synthesis, solvothermal method, autoclave method, wet method or the like.

The method for producing calcium lanthanum boride fine particles is not limited to the above-described production methods, and any method capable of producing calcium lanthanum boride fine particles according to the present invention may be used.

(6) Summary of Production Methods

The fine particle shape and size of the calcium lanthanum boride fine particles produced by the production method described in the above (1) to (5) can be controlled in various producing steps of the fine particles.

In the case of employing the step of pulverizing into nano-sized fine particles, the particle shape and the size are controlled according to a pulverizing method.

Calcium lanthanum boride is very hard because of a strong covalent bonding of B (boron), and a special method is required for pulverization. For example, when using a media stirring mill, it is known that a pulverization mode is different depending on a bead type and a bead size, and a gradual conversion of the pulverization mode is known to occur as pulverization proceeds from the early to the late stage.

In the case of the calcium lanthanum boride which is very hard, a solid follows the mode of volumetric pulverization in the early stage of pulverization, where it is broken coarsely without involving the surface. This volumetric pulverization is repeated to gradually decrease the size of particles. In the late stage of pulverization, the overall breakage takes place much less frequently even when force is applied onto the particles and the mode changes to surface pulverization where the particle surface is scraped off to produce numerous thin and fine particles. Therefore, the shape and the size of the pulverized fine particles are controlled by adjusting the pulverization conditions, thereby leading to the condition primarily involving the mode of surface pulverization. As a result, the calcium lanthanum boride fine particles according to the present invention can be obtained which is approximately a disc, a flat cylindrical, a flat, a pancake, or a flat disc-like spheroidal.

Further, in the case of producing fine particles by build-up process, control of a fine particle shape is possible by appropriately combining parameters that control the respective reaction conditions.

For example, in the wet method, calcium lanthanum boride fine particles are produced by heating lanthanum chloride and calcium chloride and sodium borohydride at 300 to 500° C. in a neutral atmosphere. Addition of a small amount of isophthalic acid changes the size and shape of the calcium lanthanum boride fine particles.

Also, in the autoclave method, in addition to the reaction temperature and pressure, a small amount addition of an additive acting as a modifier is a point of controlling the size and the shape of the fine particles.

[C] Solar Radiation Shielding Laminated Structure and Method for Production Thereof Hereinafter, the solar radiation shielding laminated structure and a process for production thereof will be described in the following order: (1) Constitution and embodiment of solar radiation shielding laminated structure, and (2) Method for producing solar radiation shielding laminated structure.

(1) Constitution and Embodiment of Solar Radiation Shielding Laminated Structure A solar radiation shielding laminated structure according to the present invention has a constitution in which an interlayer is sandwiched between two laminated sheets; the interlayer having, as an intermediate film, one or more kinds selected from a resin sheet and a resin film, and the two laminated sheets being selected from a sheet-glass and a resin board. The solar radiation shielding laminated structure also includes at least a layer having solar radiation shielding function, containing solar radiation shielding fine particles containing calcium lanthanum boride fine particles as the intermediate film and/or laminated sheet of the solar radiation shielding laminated structure, and also has solar radiation shielding function as a laminated structure.

Hereafter, explanation will be given in the following order: (i) Laminated sheet, and (ii) Interlayer and embodiment thereof.

(i) Laminated Sheet

The laminated sheets constituting the solar radiation shielding laminated structure according to the present invention are plates sandwiching an interlayer therebetween, the interlayer having, as an intermediate film, one or more kinds selected from a resin sheet and a resin film. As the laminated sheet, one or more kinds selected from sheet-glass and resin board are used, which are transparent in the visible light region. In this case, examples of a combination of two laminated sheets selected from a sheet-glass and a resin board include constitutions of sheet-glass and sheet-glass; sheet-glass and resin board; and resin board and resin board.

When a resin board is used as a laminated sheet for the solar radiation shielding laminated structure according to the present invention, a material of the resin board is appropriately selected according to the use of the solar radiation shielding laminated structure, and it is not particularly limited. For instance, when used for an automobile or the like, from the viewpoint of securing see-through of a driver or occupants in the automobile, transparent resin such as polycarbonate resin, acrylic resin, polyester resin, or polystyrene resin is desirable, but other resin such as polyether imide resin, acrylic-styrene copolymer (MS resin), polyether sulfone resin, vinyl resin, olefin resin, epoxy resin, polyimide resin, fluorine-based resin, and the like can be used.

Further, when a sheet-glass is used as a laminated sheet for the solar radiation shielding laminated structure according to the present invention, a material of the sheet-glass is appropriately selected according to the use of the solar radiation shielding laminated structure, and it is not particularly limited. For example, an ordinary inorganic transparent sheet-glass can be used, green glass can be used, and a heat ray absorbing glass characterized by containing copper and phosphorus as components can also be used.

As embodiment examples of a laminated sheet, there are an embodiment of using sheet-glass or the above-described resin board as a plain sheet (in the present specification, referred to as "Embodiment α" for the sake of convenience), and an embodiment of using the above-described resin board in which fine particles having solar radiation shielding function are contained (in the present specification, referred to as "Embodiment β" for the sake of convenience).

(ii) Interlayer and Embodiments Thereof

As described above, in the solar radiation shielding laminated structure according to the present invention, an interlayer is sandwiched between two laminated sheets, the interlayer having, as an intermediate film, one or more kinds selected from a resin sheet and a resin film, the two laminated sheets being selected from a sheet-glass and a resin board. Hereafter, as an embodiment example of the interlayer having the solar radiation shielding function (Embodiments 1 to 7) will be described.

(Embodiment 1) Embodiment constituted by intermediate film containing fine particles having solar radiation shielding function (hereinafter referred to as "Embodiment 1" for the sake of convenience).

(Embodiment 2) Embodiment constituted by an interlayer including two or more intermediate films, at least one of which contains fine particles having solar radiation shielding function (hereinafter referred to as "Embodiment 2" for the sake of convenience).

(Embodiment 3) Embodiment includes a solar radiation shielding layer containing fine particles having solar radiation shielding function, formed on an inner surface of a sheet-glass or a resin board of at least one of laminated sheets, and intermediate film stacked on the shielding layer, the intermediate film and the shielding layer forming an interlayer (hereinafter referred to as "Embodiment 3" for the sake of convenience).

(Embodiment 4) Embodiment in which an interlayer includes a solar radiation shielding resin film sandwiched between two or more intermediate films. The solar radiation shielding resin film includes a solar radiation shielding layer containing fine particles having solar radiation shielding function formed on one surface of the resin film having ductility or includes fine particles having solar radiation shielding function contained in the resin film having ductility (hereinafter referred to as "Embodiment 4" for the sake of convenience).

(Embodiment 5) Embodiment in which an interlayer includes a solar radiation shielding layer containing fine particles having solar radiation shielding function formed on one surface of an intermediate film (hereinafter referred to as "Embodiment 5" for the same of convenience).

(Embodiment 6) Embodiment in which an interlayer includes, as an intermediate film, a laminate including an adhesive layer, a solar radiation shielding layer containing the fine particles having solar radiation shielding function, and a peeling layer, laminated in this order; the adhesive layer of the laminate is bonded to an inner surface of one of the two laminated sheets selected from sheet-glass and plastics; and an intermediate film or two or more intermediate films are stacked on the peeling layer side of the laminate (hereinafter referred to as "Embodiment 6" for the sake of convenience).

(Embodiment 7) Embodiment in which the interlayer does not contain fine particles having solar radiation shielding function (hereinafter referred to as "Embodiment 7" for the sake of convenience).

As materials for the intermediate film constituting the interlayer, synthetic resin is desirable from a viewpoint of optical characteristics, mechanical properties, and material costs, and vinyl resin is more desirable. Furthermore, from the similar viewpoint, polyvinyl butyral or ethylene-vinyl acetate copolymer is desirable among the vinyl resin. Polyvinyl butyral is the most commonly used material for intermediate film. Ethylene-vinyl acetate copolymers have low penetration resistance and are generally more expensive than polyvinyl butyral, but have the advantage of having excellent followability to the printed surface and excellent adhesion to PET and polycarbonate.

(2) Method for Producing Solar Radiation Shielding Laminated Structure

A method for producing an intermediate film will be described which contains the solar radiation shielding fine particles and constitutes an interlayer having the solar radiation shielding function in the solar radiation shielding laminated structure.

The intermediate film containing the solar radiation shielding fine particles can be obtained by adding an additive liquid for forming an intermediate film to a resin constituting the intermediate layer, kneading and forming the resultant into a sheet, the additive liquid for forming the intermediate film being obtained by dispersing the above-described solar radiation shielding fine particles in a suitable solvent.

Hereinafter, explanation will be given in the following order: (i) Additive liquid for forming intermediate film and method for production thereof, (ii) Optical property of additive liquid for forming intermediate film and method for measurement, (iii) Material for constituting intermediate film, (iv) Method for forming intermediate film, and (v) Constitution example of various solar radiation shielding laminated structure and method for production thereof.

(i) Additive Liquid for Forming Intermediate Film and Method for Production Thereof The additive liquid for forming the intermediate film can be obtained by dispersing the above-described solar radiation shielding fine particles in a plasticizer or a suitable solvent. As a method for dispersing the solar radiation shielding fine particles in a plasticizer or an appropriate solvent, any method can be applied as long as the method can uniformly disperse the solar radiation shielding fine particles in the plasticizer or the appropriate solvent. Examples include a pulverization and dispersion treatment method using a device such as a bead mill, a ball mill, a sand mill, a paint shaker, an ultrasonic homogenizer, or the like. By the dispersion treatment using these machines, the dispersion of the solar radiation shielding fine particles into the solvent and the fine particle formation due to collision of the fine particles and the like proceed simultaneously, thereby the fine particles can be further micronized and dispersed (i.e., they are subjected to pulverization and dispersion treatment).

A solvent to disperse solar radiation shielding fine particles is not particularly limited, and can be suitably selected according to coating and kneading conditions, coating and kneading environment, and further, according to binder in the case of containing inorganic binder or resin binder. As the organic solvent, various solvents such as alcoholic, ketone-based, hydrocarbon-based, glycol-based, and aqueous solvents can be selected. Specific examples include: alcoholic solvents such as methanol, ethanol, 1-propanol, isopropanol, butanol, pentanol, benzyl alcohol, diacetone alcohol; ketone-based solvents such as acetone, methyl ethyl ketone, methyl propyl ketone, methyl isobutyl ketone, cyclohexanone, isophorone; ester-based solvents such as 3-methyl-methoxy-propionate; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate; amides such as formamide, N-methyl formamide, dimethyl formamide, dimethyl acetamide, N-methyl-2-pyrrolidone; aromatic hydrocarbons such as toluene, xylene; halogenated hydrocarbons such as ethylene chloride, chlorobenzene. Among them, an organic solvent having low polarity is preferred, and isopropyl alcohol, ethanol, 1-methoxy-2-propanol, dimethyl ketone, methyl ethyl ketone, methyl isobutyl ketone, toluene, propylene glycol monomethyl ether acetate, n-butyl acetate and the like are more preferred. The solvent can be used alone or in combination of two or more. For example, water, and various organic solvents like alcohols such as ethanol, propanol, butanol, isopropyl alcohol, isobutyl alcohol, diacetone alcohol, ethers such as methyl ether, ethyl ether, propyl ether, esters, ketones such as acetone, methyl ethyl ketone, diethyl ketone, cyclohexanone, isobutyl ketone can be used.

Further, an acid or alkali may be added to the additive liquid for forming the intermediate film to adjust pH, if necessary. Needless to say, it is also possible to add various kinds of surfactants, coupling agents and the like to further improve the dispersion stability of the fine particles in the additive liquid.

The dispersant, coupling agent, and surfactant can be selected according to the intended use, but preferably have an amine-containing group, a hydroxyl group, a carboxyl group, or an epoxy group as a functional group. These functional groups have effects of adsorbing on the surface of the calcium lanthanum boride fine particles, preventing aggregation of the calcium lanthanum boride fine particles, and uniformly dispersing the fine particles.

As a dispersant which can be suitably used, phosphate ester compounds, polymeric dispersants, silane coupling agents, titanate coupling agents, aluminum coupling agents, etc., can be used. However, the dispersant is not limited thereto. As a polymeric dispersant, acrylic polymeric dispersants, urethane-based polymeric dispersants, acrylic block copolymer-based polymeric dispersants, polyether-based dispersants, polyester-based polymeric dispersants, etc., can be used.

An addition amount of the dispersant is preferably in a range of 10 parts by mass or more and 1000 parts by mass or less, and more preferably in the range of 20 parts by mass or more and 200 parts by mass or less, with respect to 100 parts by mass of the calcium lanthanum boride fine particles. With the addition amount of the dispersant within the above range, the calcium lanthanum boride fine particles do not aggregate in the liquid, and dispersion stability is maintained.

Further, the additive liquid for forming the intermediate film can be constituted by containing an inorganic binder and/or a resin binder. The kind of the inorganic binder or the resin binder is not particularly limited. For instance, examples of the inorganic binder include metal alkoxide of silicon, zirconium, titan, or aluminum or these partial hydrolysis condensation polymerization products or organosilazane, and as the resin binder, thermoplastic resin such as acrylic resin or thermosetting resin such as epoxy resin or the like can be used.

In order to impart UV radiation shielding function to the intermediate film, it is also possible to add at least one or more kinds of inorganic particles of titanium oxide, zinc oxide or cerium oxide, organic benzophenone, benzotriazole or the like.

(ii) Optical Property of Additive Liquid for Forming Intermediate Film and Method for Measurement The optical properties of the additive liquid for forming the intermediate film can be measured as follows. The additive liquid for forming the intermediate film is charged in an appropriate transparent vessel and the transmittance can be measured as a function of a wavelength using a spectrophotometer. The above-described additive liquid for forming the intermediate film containing the solar radiation shielding fine particles dispersed therein has a main absorption peak in a range of wavelengths approximately from 850 nm to 5000 nm. On the other hand, the spectrophotometer enables a measurement of up to about 2600 nm wavelength, and further, the transmittance at wavelengths beyond 2600 nm can be measured using a Fourier transform infrared spectrometer (FTIR). In the measurement, the transmittance of the additive liquid can be easily adjusted by diluting the liquid with a dispersion solvent or a suitable solvent having compatibility with the dispersion solvent.

(iii) Material for Constituting Intermediate Film

As the material for constituting the intermediate film, it is preferable to use a synthetic resin, particularly, vinyl resin from the viewpoint of the optical properties, the mechanical property, and the material cost. Examples of the plasticizer to adjust plasticity of the above-described vinyl resin include, without particular limitation, dioctyl phthalate, dibutyl phthalate, di-isobutyl phthalate, di-2-ethylhexyl adipate, di-isodecyl adipate, epoxy fatty acid monoester, triethylene glycol-di-2-ethylbutyrate, triethylene glycol-di-2-ethylhexonate, dibutyl sebacate, dibutyl sebacate and the like.

As the above-described vinyl resin, for instance, polyvinyl acetal typified by polyvinyl butyral, polyvinyl chloride, vinyl chloride-ethylene copolymer, vinyl chloride-ethylene-glycidyl methacrylate copolymer, vinyl chloride-ethylene-glycidyl acrylate copolymer, vinyl chloride-glycidyl methacrylate copolymer, vinyl chloride-glycidyl acrylate copolymer, polyvinylidene chloride, vinylidene chloride-acrylonitrile copolymer, polyvinyl acetate ethylene-vinyl acetate copolymer, ethylene-vinyl acetate copolymer, a mixture of polyvinyl acetal-polyvinyl butyral, and the like. From the viewpoint of adhesion with glass or plastics, transparency, safety, and the like, polyvinyl acetal typified by polyvinyl butyral and ethylene-vinyl acetate copolymer are particularly preferred. Polyvinyl butyral is the most commonly used material for intermediate film. Ethylene-vinyl acetate copolymers have low penetration resistance and are generally more expensive than polyvinyl butyral, but advantageously have excellent followability to the printed surface and excellent adhesion to PET and polycarbonate.

(iv) Method for Forming Intermediate Film

As a method for forming a sheet for the intermediate film containing the solar radiation shielding fine particles or a sheet for the intermediate film not containing solar radiation shielding fine particles, a known method can be used. For example, a calendar roll method, an extrusion method, a casting method, an inflation method, and the like can be used. In particular, the sheet for the intermediate film containing the solar radiation shielding fine particles and the vinyl resin is produced by adding the additive liquid for forming the intermediate film to the vinyl resin, kneading to obtain a vinyl resin composition in which the solar radiation shielding fine particles are uniformly dispersed in the vinyl resin, and forming the obtained vinyl resin composition into a sheet. When the vinyl resin composition is formed into a sheet, a heat stabilizer, an antioxidant, an UV shielding material, or the like may be compounded, as needed, or adhesion force regulator (for example, a metal salt) may be compounded for controlling sheet penetration ability.

(v) Constitution Example of Various Solar Radiation Shielding Laminated Structure and Method for Production Thereof Referring to FIGS. 3 to 9, constitution examples of various solar radiation shielding laminated structures combining: "Embodiment $\alpha$", "Embodiment $\beta$" of the above-described laminated sheet with "Embodiments 1 to 6" which are embodiment example of interlayers having solar radiation shielding function or "Embodiment 7" which is an embodiment example of an interlayer without having solar radiation shielding function, taking as an example of the case of using vinyl resin as the intermediate film. FIGS. 3 to 9 are schematic cross-sectional views of each of "Embodiments 1 to 7" combined with "Embodiment $\alpha$, $\beta$". Note that an embodiment of the laminated structure including the laminated sheet of "Embodiment $\alpha$" and the intermediate film of "Embodiment 1" is referred to as "Embodiment $\alpha$-1".

Embodiment α-1

Figure 3:
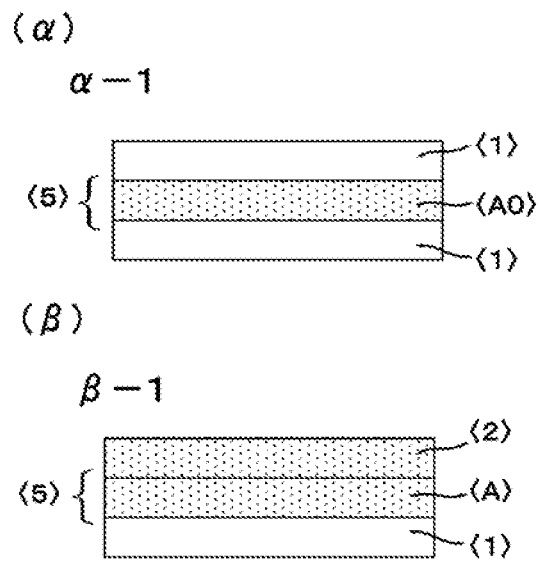
FIG. 3(α) illustrates a schematic view of a cross-section of a laminated structure according to an embodiment (α-1)

Embodiment α-1 is a laminated structure using, as laminated sheets, two laminated sheets <1> not containing solar radiation shielding fine particles, and an interlayer <5> is constituted by a resin sheet <A0> containing solar radiation shielding fine particles (See FIG. 3 (α)).

Embodiment α-1 is produced as follows.

An additive liquid for forming an intermediate film is added to a vinyl resin to produce a vinyl resin composition. The vinyl resin composition is formed into a sheet to obtain a resin sheet <A0> containing solar radiation shielding fine particles. The resin sheet <A0> containing the solar radiation shielding fine particles is sandwiched and bonded between two laminated sheets <1> not containing fine particles, to produce a laminated structure.

The above-described production method is an example of a production method including dispersing the solar radiation shielding fine particles in a plasticizer. The vinyl resin composition may be produced by a production method including dispersing the fine particles having solar radiation shielding function in an appropriate solvent rather than a plasticizer to prepare a dispersion liquid, adding the dispersion liquid to the vinyl resin, and separately adding a plasticizer. According to these production methods, Embodiment α-1 can be produced, which is a laminated structure having high solar radiation shielding function and a low haze value. Further, according to these production methods, a laminated structure can be easily produced, which means that a laminated structure can be produced at inexpensive production costs.

Embodiment β-1

Embodiment β-1 is a laminated structure in which an interlayer <5> is an intermediate film <A> including a resin sheet containing solar radiation shielding fine particles, and at least a laminated sheet of a resin board containing solar radiation fine particles having solar radiation shielding function different from the function of the intermediate film <A> is used as at least one of the laminated sheets (see, FIG. 3(β)). As long as the above conditions are satisfied, the solar radiation shielding fine particles may be contained in the other laminated sheet including the resin board (not shown). The above-described constitution in which the solar radiation shielding fine particles may be contained in both laminated sheets including the resin board can be similarly used in Embodiments β-2, β-3, β-4, β-5, β-6, and β-7 described later (not shown).

The laminated structure according to Embodiment β-1 can be produced in the same manner as Embodiment α-1, except that at least one of the two laminated sheets is substituted with a laminated sheet <2> that includes a resin board containing solar radiation shielding fine particles having a solar radiation shielding function different from the function of the intermediate film <A>.

This embodiment can produce a laminated structure having a high solar radiation shielding function and a low haze value similarly to the Embodiment α-1. Furthermore, this method also enables easy production of the laminated structure and hence production of the laminated structure at inexpensive production cost.

Embodiment α-2

Figure 4:
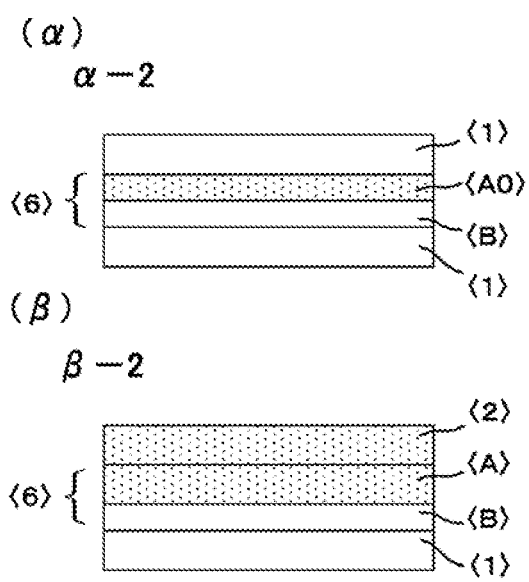
FIG. 4(α) illustrates a schematic view of a cross-section of a laminated structure according to an embodiment (α-2)

Embodiment α-2 is a laminated structure using two laminated sheets <1> not containing solar radiation shielding fine particles as laminated sheets and at least two or more resin sheets including a resin sheet <A0> containing solar radiation shielding fine particles and a resin sheet <B> not containing solar radiation shielding fine particles as an interlayer <6> (See FIG. 4 (α)).

Embodiment α-2 is produced as follows. First, an additive liquid for forming the intermediate film is produced. The additive liquid is added to a vinyl resin to prepare a vinyl resin composition. The vinyl resin composition is formed into a sheet to obtain a resin sheet <A0> containing solar radiation shielding fine particles. Meanwhile, a resin sheet <B> not containing fine particles is produced by an ordinary method. The resin sheet <A0> containing the produced solar radiation shielding fine particles is stacked on the resin sheet <B> not containing fine particles. Further, the resin sheet <A0> containing solar radiation shielding fine particles may be sandwiched between two resin sheets <B> not containing fine particles to prepare an interlayer <6>. The thus-obtained interlayer <6> is sandwiched between two laminated sheets <1> not containing fine particles and bonded to form a laminated structure.

Furthermore, a constitution may be acceptable in which a plurality of resin sheets containing solar radiation shielding fine particles are laminated, at least one of the sheets being a resin sheet <A'> containing solar radiation shielding fine particles having solar radiation shielding function, and at least one of other sheets being a resin sheet <A"> containing fine particles having solar radiation shielding function different from that of the calcium lanthanum boride fine particles. As explained in Embodiment α-1, a vinyl resin composition may be produced by a method which includes adding a dispersion liquid containing the fine particles having a solar radiation shielding function dispersed in an appropriate solvent to a vinyl resin, instead of dispersing the fine particles having a solar radiation shielding function in a vinyl resin, and separately adding a plasticizer.

According to this production method, a laminated structure having a high solar radiation shielding function and a low haze value can be produced at in expensive production costs. Further, according to this method, the adhesiveness between the interlayer <6> and the two laminated sheets <1> not containing fine particles can be improved, and thus the strength of the laminated structure is increased, which is preferable. Furthermore, for example, it is also preferable to form an intermediate layer by preparing PET film having Al layer, Ag layer, or the like formed by sputtering or the like on at least one surface and form an interlayer <6> by allowing the PET film between the resin sheet <A0> and the resin sheet <B>; or to add a suitable additive to a resin sheet <B> not containing fine particles. With the interposed resin film including Al layer or Ag layer formed thereon or addition of the additives can impart functions such as color tone adjustment.

Embodiment β-2

Embodiment β-2 is a laminated structure in which an interlayer <6> includes two or more intermediate films, at least one of them is an intermediate film including a resin sheet <A> containing solar radiation shielding fine particles, and at least one of the two laminated sheets is a resin board containing solar radiation fine particles having solar radiation shielding function different from that of the intermediate film (see, FIG. 4(β)).

The laminated structure according to Embodiment β-2 can be produced in the same manner as Embodiment α-2, except that at least one of the two laminated sheets <1> not containing fine particles is replaced with a laminated sheet <2> that includes a resin board containing solar radiation shielding fine particles having solar radiation shielding function different from that of the intermediate film. It is sufficient to select and constitute the laminated structure of Embodiment β-2 so that at least one or more kinds of solar radiation shielding fine particles having at least solar radiation shielding function are contained in the intermediate film including the resin sheet <A> and in the laminated sheet <2> containing the solar radiation shielding fine particles.

According to the methods, a laminated structure having a high solar radiation shielding function and a low haze value can be produced at inexpensive production costs. According to the constitution, similarly to Embodiment α-2, the adhesiveness between the resin sheet <B> not containing fine particles and two laminated sheets selected from sheet-glass and plastics can be increased to suitably enhance strength of the laminated structure, which is preferable.

Embodiment α-3

Embodiment α-3 uses two laminated sheets <1> not containing fine particles to sandwich the interlayer <7> therebetween. Further, it is the laminated structure in which the interlayer <7> includes a shielding layer <C0> containing solar radiation shielding fine particles formed on the laminated sheet <1> not containing fine particles, and the resin sheet <B> not containing fine particles (see, FIG. 5(α)).

Embodiment α-3 is produced as follows, for example. First, the solar radiation shielding fine particles having a solar radiation shielding function are dispersed in a plasticizer or an appropriate solvent to produce an additive liquid. Then, an appropriate binder component (an inorganic binder such as silicate or an organic binder such as acrylic, vinyl, or urethane-based binder) is added to the additive liquid to produce a coating liquid. The coating liquid is coated on an inner surface of at least one laminated sheet <1> of the laminated sheets <1> not containing fine particles to form a shielding layer <C0> containing solar radiation shielding fine particles. On the other hand, a resin composition not containing solar radiation shielding fine particles is formed into a sheet to obtain a resin sheet <B> not containing solar radiation shielding fine particles. The resin sheet <B> not containing the solar radiation shielding fine particles is sandwiched and bonded between the shielding layer <C0> containing solar radiation shielding fine particles formed on the laminated sheet <1> not containing fine particles and the other laminated sheet <1> not containing fine particles, to produce a laminated structure.

On the other hand, an interlayer <7> may be produced in the same manner as in the production of Embodiment α-3, except that, in place of the shielding layer <C0> containing fine particles, a shielding layer <C'> containing the solar radiation shielding fine particles having solar radiation shielding property different from that of the calcium lanthanum boride fine particles is provided on one of the laminated sheet <1> not containing the fine particles while a shielding layer <C"> containing the calcium lanthanum boride fine particles is provided on the other laminated sheet <1> not containing the fine particles.

According to the production method, the thickness of the shielding layer <C0> containing the solar radiation shielding fine particles on the laminated sheet <1> can be set to be smaller. Since the shielding layer <C0> containing the solar radiation shielding fine particles exhibits an infrared reflection effect as well as absorption effect by setting its thickness to be smaller, the solar radiation shielding function of the laminated structure can be improved. Accordingly, a laminated structure having a high solar radiation shielding function and a low haze value can be produced at inexpensive production costs. Further, addition of an appropriate additive to the resin sheet <B> not containing fine particles can impart functions such as color tone adjustment. Such an effect is also exhibited in the case where, as an interlayer <7>, a shielding layer <C'> containing solar radiation shielding fine particles having solar radiation shielding property different from that of the calcium lanthanum boride fine particles is formed on one of the laminated sheet <1> not containing fine particles while a shielding layer <C"> containing the calcium lanthanum boride fine particles is formed onto the other laminated sheet <1> not containing the fine particles.

Embodiment β-3

Figure 5:
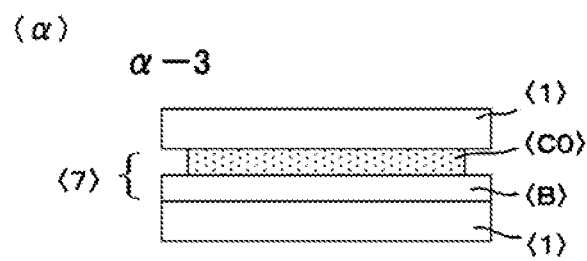
FIG. 5(α) illustrates a schematic view of a cross-section of a laminated structure according to an embodiment (α-3)

Embodiment β-3 is a laminated structure using a laminated sheet <2> containing the solar radiation shielding fine particles as at least one laminated sheet of the two laminated sheets <1>, in which an interlayer <7> includes a shielding layer <C> containing the solar radiation shielding fine particles formed on an inner surface of at least one of the glass or resin board, and an intermediate film including a resin sheet <B> not containing the fine particles overlaid on the shielding layer <C> (See FIG. 5(β)).

The laminated structure according to Embodiment β-3 can be produced in the same manner as Embodiment α-3, except that at least one of the two laminated sheets <1> is replaced with a laminated sheet of a resin board <2> containing solar radiation shielding fine particles having solar radiation shielding function. It is sufficient to select and constitute the above-described constitution so that at least one or more kinds of fine particles at least having solar radiation shielding function are contained in the interlayer <7> and laminated sheet <2> containing the solar radiation shielding fine particles of the laminated structure of the embodiment.

According to the method, similarly to Embodiment α-3, the thickness of the solar radiation shielding layer can be set to be smaller in the laminate structure. Since an infrared reflection effect as well as absorption effect can be developed by setting the thickness to be smaller, the solar radiation shielding function of the laminated structure can be improved. Accordingly, a laminated structure having a high solar radiation shielding function and a low haze value can be produced at inexpensive production costs. Further, addition of an appropriate additive to the resin sheet <B> not containing fine particles can impart functions such as color tone adjustment.

Embodiment α-4

Embodiment α-4 uses two laminated sheets <1> not containing fine particles to sandwich the interlayer <8> therebetween. Then, the ductile resin film <D> and the shielding layer <C0> containing the solar radiation shielding fine particles formed on the film are sandwiched between the resin sheets <B> not containing the fine particles to form an interlayer <8>. The interlayer <8> is sandwiched between two laminated sheets <1> not containing fine particles to form the laminated structure (see, FIG. 6(α)). The interlayer <8> may also be formed by sandwiching the ductile resin film <D> containing the solar radiation shielding fine particles having solar radiation shielding function between the resin sheets <B> not containing fine particles.

As a method for producing Embodiment α-4, two examples thereof will be hereinafter described.

<Production Method 1 for Embodiment α-4>

The case where the ductile resin film <D> and the shielding layer <C0> containing the solar radiation shielding fine particles formed on the film are sandwiched between the resin sheets <B> not containing the fine particles to form an interlayer <8> will be described.

First, a coating liquid of the solar radiation shielding fine particles having solar radiation shielding function dispersed in a plasticizer or an appropriate solvent, or a coating liquid prepared by further compounding an appropriate binder component (an inorganic binder such as silicate or an organic binder such as acrylic, vinyl, or urethane-based binder) to the coating liquid is produced. This coating liquid is coated on one surface of the ductile resin sheet <D> to form a shielding layer <C0> containing the solar radiation shielding fine particles on the ductile resin film <D>. Further, when a shielding layer <C0> containing the solar radiation shielding fine particles on the ductile resin film <D>, the surface of the ductile resin film <D> may be subjected to surface treatment for the purpose of improving a binding property with a coating liquid resin binder, such as corona treatment, plasma treatment, flame treatment, primer layer coating treatment, and the like.

On the other hand, a vinyl resin composition not containing solar radiation shielding fine particles having solar radiation shielding function is formed into a sheet to obtain a resin sheet <B> not containing fine particles. Then, the ductile resin film <D> and the shielding layer <C0> containing the solar radiation shielding fine particles formed thereon are sandwiched between the resin sheets <B> not containing the fine particles to form an interlayer <8>. Taking such a constitution can avoid the problem on adhesiveness between the shielding layer <C0> containing the fine particles on the ductile resin film <D> and the laminated sheet <1> not containing fine particles.

Also in the interlayer <8>, a shielding layer <C0> containing solar radiation shielding fine particles, which is a single shielding layer, may be divided into a shielding layer <C'> containing calcium lanthanum boride fine particles and a shielding layer <C''> containing solar radiation shielding fine particles having shielding property different from that of the shielding layer <C'>. The constitution in which an appropriate additive having an effect such as color tone adjustment is contained in the resin sheet <B> is also preferred.

<Production Method 2 for Embodiment α-4>

The constitution in which the interlayer <8> is formed by sandwiching a ductile resin film <D> with fine particles having solar radiation shielding function dispersed therein between resin sheets <B> not containing fine particles.

The resin having a ductility is heated at a temperature near its melting point (around 200 to 300° C.) and mixed with the calcium lanthanum boride fine particles to form a mixture. Next, the mixture is pelletized, a resin film or a resin board is formed by a predetermined forming method, and thus a ductile resin film <D> is produced in which the solar radiation shielding fine particles having solar radiation shielding function are dispersed. Examples of the molding method include extrusion molding, inflation molding, solution casting, and casting. The thickness of the resin film or resin board at the time of the molding may be appropriately selected according to the purpose of use.

The amount of solar radiation shielding fine particles having a solar radiation shielding function to be added to the resin having ductility may be variable depending on the thickness of the substrate and the required optical properties and mechanical properties, but is generally 50 mass % or less with respect to the mass of the resin.

On the other hand, a vinyl resin composition not containing solar radiation shielding fine particles is formed into a sheet to obtain a resin sheet <B> not containing fine particles. The interlayer <8> is formed by sandwiching a ductile resin film <D> with the solar radiation shielding fine particles having a solar radiation shielding function dispersed therein between two resin sheets <B> not containing fine particles. The interlayer <8> is sandwiched between the laminated sheets <1> not containing fine particles and bonded to produce a laminated structure. In addition, the constitution in which an appropriate additive having an effect such as color tone adjustment is added to the resin sheet <B> not containing fine particles as necessary is also preferred. With this constitution, a laminated structure having multiple functions can be obtained.

Also according to the above-described <Production methods 1, 2 for Embodiment α-4>, the thickness of the shielding layer <C0> containing the solar radiation shielding fine particles on the ductile resin film <D> in one constitution, or of the shielding layer <C'> having solar radiation shielding function and shielding layer <C''> containing the solar radiation shielding fine particles having solar radiation shielding property different from that of the shielding layer <C'> in other constitution can be set to be smaller. Since an infrared reflection effect as well as absorption effect can be developed by setting the thickness of the shielding layer to be smaller, the infrared radiation shielding function of the laminated structure can be improved. As a result, a laminated structure having a high shielding function and a low haze value can be produced at inexpensive production costs.

Embodiment β-4

Figure 6:
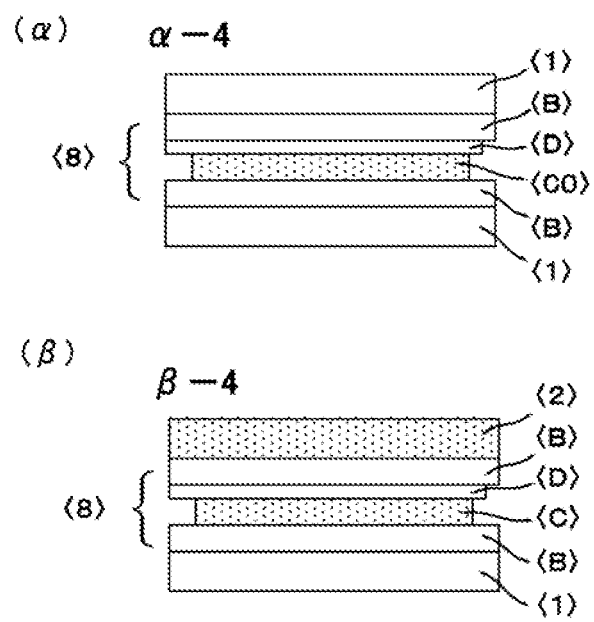
FIG. 6(α) illustrates a schematic view of a cross-section of a laminated structure according to an embodiment (α-4)

Embodiment β-4 is a laminated structure using a laminated sheet <2> containing the solar radiation shielding fine particles as at least one laminated sheet, in which an interlayer <8> including a shielding layer <C> containing the solar radiation shielding fine particles formed on one surface of the ductile resin film <D> sandwiched between two resin sheets <B> not containing the fine particles is sandwiched between two laminated sheets <1> and <2> (See FIG. 6(β)). As another constitution of a laminated structure according to Embodiment β-4, a constitution is also preferable in which an interlayer <8> including a ductile resin film <D> having shielding function due to solar radiation shielding fine particles having solar radiation shielding function dispersed in the ductile resin film <D> sandwiched between two resin sheets <B> not containing the fine particles is sandwiched between two laminated sheets <1> and <2>.

The laminated structure according to Embodiment β-4 can be produced in the same manner as Embodiment α-4, except that at least one of the two laminated sheets <1> is replaced with a laminated sheet <2> containing solar radiation shielding fine particles. It is sufficient to select and constitute the above-described constitution so that at least one or more kinds of fine particles at least having solar radiation shielding function are contained in the interlayer <8> and the laminated sheet <2> containing the solar radiation shielding fine particles of the laminated structure of the embodiment.

According to the method, similarly to Embodiment α-4, the thickness of the solar radiation shielding layer can be set to be smaller in the laminate structure. Since the solar radiation shielding layer exhibits an infrared reflection effect as well as absorption effect by setting the thickness of the shielding layer to be smaller, the shielding function can be improved. Accordingly, a laminated structure having a high shielding function and a low haze value can be produced at inexpensive production costs. Further, addition of an appropriate additive to the resin sheet <B> not containing fine particles can impart functions such as color tone adjustment.

Embodiment α-5

Embodiment α-5 uses two laminated sheets <1> not containing fine particles to sandwich the interlayer <9> therebetween. The interlayer <9> is a laminated structure including a resin sheet <B> not containing fine particles and a shielding layer <C0> containing calcium lanthanum boride fine particles formed thereon (see, FIG. 7(α)).

Embodiment α-5 is produced as follows, for example. The solar radiation shielding fine particles having a solar radiation shielding function are dispersed in a plasticizer or an appropriate solvent to produce an additive liquid. Then, an appropriate binder component (an inorganic binder such as silicate or an organic binder such as acrylic, vinyl, or urethane-based binder) is added to the additive liquid to produce a coating liquid. The coating liquid is coated on one surface of a resin sheet <B> not containing fine particles to form a shielding layer <C0> containing solar radiation shielding fine particles. Then, the resin sheet <B> not containing the solar radiation shielding fine particles and the shielding layer <C0> containing solar radiation shielding fine particles formed thereon are sandwiched and bonded between two laminated sheets <1> not containing fine particles to produce a laminated structure.

On the interlayer <9>, as described above, a shielding layer <C0> containing solar radiation shielding fine particles, which is a single shielding layer, may be divided into a shielding layer <C'> having solar radiation shielding function and a shielding layer <C''> containing solar radiation shielding fine particles having shielding property different from that of the shielding layer <C'>.

According to the production method, the shielding layer containing the solar radiation shielding fine particles having solar radiation shielding function is formed on a surface of a resin sheet <B> not containing the fine particles by coating a coating liquid onto one surface of the resin sheet <B> not containing the fine particles, the coating liquid including the solar radiation shielding fine particles having solar radiation shielding function dispersed in a binder component. In this production method, an additive such as filler may be added as needed to the coating liquid containing the solar radiation shielding fine particles having solar radiation shielding function to improve the shielding function. Accordingly, a laminated structure having high shielding function and a low haze value can be produced at inexpensive production costs.

Embodiment β-5

Figure 7:
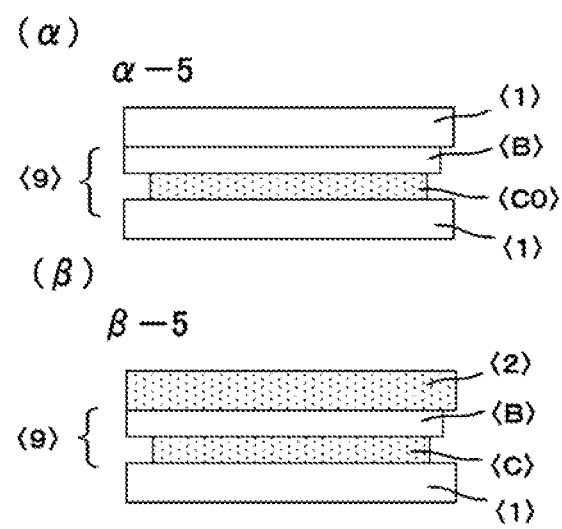
FIG. 7(α) illustrates a schematic view of a cross-section of a laminated structure according to an embodiment (α-5)

Embodiment β-5 is a laminated structure prepared by using a laminated sheet <2> containing the solar radiation shielding fine particles as at least one laminated sheet, coating a coating liquid of the solar radiation shielding fine particles having solar radiation shielding function dispersed in a binder component onto one surface of the resin sheet <B> not containing the solar radiation shielding fine particles to obtain an interlayer <9> with a shielding layer <C> containing the solar radiation shielding fine particles formed thereon, and sandwiching and bonding the interlayer between the laminated sheet <1> not containing the fine particles and the laminated sheet <2> containing the fine particles (See FIG. 7(β)).

The laminated structure according to Embodiment β-5 can be produced in the same manner as Embodiment α-5, except that at least one of the two laminated sheets <1> not containing the solar radiation shielding fine particles is replaced with a laminated sheet <2> containing the solar radiation shielding fine particles. It is sufficient to select and constitute the above-described constitution so that at least one or more kinds of fine particles at least having solar radiation shielding function are contained in the interlayer <9> and laminated sheet <2> containing the solar radiation shielding fine particles of the laminated structure of the embodiment.

By this method, since the shielding layer <C> containing the fine particles having solar radiation shielding function is formed on the surface of the resin sheet which is an intermediate film, an additive such as a filler can be further added as needed to the solar radiation shielding fine particles having solar radiation shielding function to improve the shielding property. Accordingly, a laminated structure having high shielding function and a low haze value can be produced at inexpensive production costs.

Embodiment α-6

Figure 8:
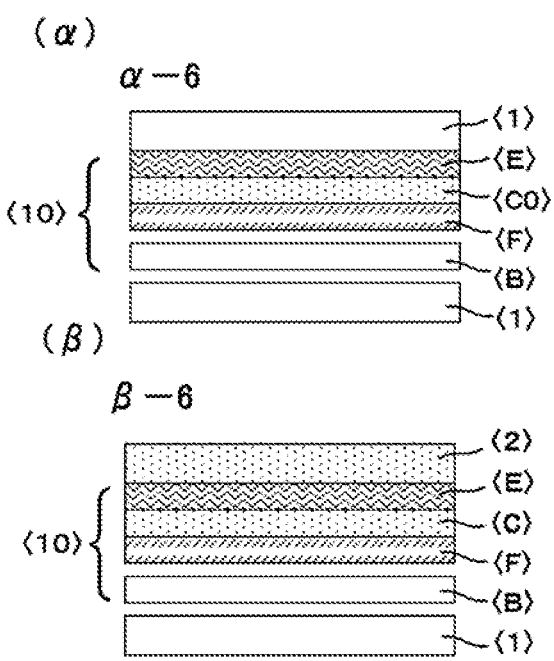
FIG. 8(α) illustrates a schematic view of a cross-section of a laminated structure according to an embodiment (α-6)

Embodiment α-6 uses two laminated sheets <1> not containing the fine particles to sandwich the interlayer <10> therebetween (see, FIG. 8(α)). The interlayer <10> is a laminated constitution including an adhesive layer <E>, a shielding layer <C0> containing the solar radiation shielding fine particles, a peeling layer <F>, and a resin sheet <B> not containing the solar radiation shielding fine particles. In Embodiment α-6, a laminate including the shielding layer <C0> containing the solar radiation shielding fine particles and the peeling layer <F> is bonded to the laminated sheet <1> not containing the solar radiation shielding fine particles by the effect of the adhesive layer <E>. That is, Embodiment α-6 has a laminated structure including a laminated sheet <1> not containing the fine particles/an adhesive layer <E>/a shielding layer <C0> containing the solar radiation shielding fine particles/a peeling layer <F>/a resin sheet <B> not containing the fine particles—other laminated sheet <1> not containing the fine particles.

Embodiment α-6 is produced as follows, for example. First, a peeling layer <F> (for instance, a wax layer, an acrylic resin layer, a polyvinyl acetal layer represented by polyvinyl butyral) is formed on one surface of a film sheet (for instance, resin film such as polyester, polypropylene, polyethylene, polyethylene terephthalate, polycarbonate, polyimide, fluorine, and so on, paper, cellophane or the like can be cited). On this peeling layer <F>, a shielding layer <C0> containing the solar radiation shielding fine particles is formed. Further, on the shielding layer <C0> containing the solar radiation shielding fine particles, an adhesive layer <E> (for instance, polyvinyl acetal layer represented by polyvinyl butyral, polyvinyl chloride layer, polyvinyl chloride-ethylene copolymer layer, vinyl chloride-ethylene-glycidyl methacrylate copolymer layer, vinyl chloride-ethylene-glycidyl acrylate copolymer layer, polyvinylidene chloride layer, vinylidene chloride-acrylonitrile copolymer layer, polyamide layer, polymethacrylic acid ester layer, acrylic acid ester copolymer layer, and the like can be cited)

is formed to obtain a transfer film as a laminate. After the adhesive layer <E> of the transfer film is bonded under pressure to the inner surface of the laminated sheet <1> not containing the fine particles, the film sheet is peeled off from the transfer film. Owing to the presence of the peeling layer <F>, only the film sheet is peeled off from the laminate. The resin sheet <B> not containing the fine particles is stacked on the laminate to obtain an interlayer <10>. The interlayer is sandwiched between two laminated sheets <1> not containing fine particles to produce a laminated structure of Embodiment α-6.

As an example of a laminated structure according to Embodiment α-6, a constitution including an interlayer <10> sandwiched between two laminated sheets <1> not containing the solar radiation shielding fine particles may be mentioned. The interlayer <10> includes a resin sheet <B> not containing the solar radiation shielding fine particles/a peeling layer <F>/a shielding layer <C0> containing the solar radiation shielding fine particles/an adhesive layer <E>. In the constitution, a shielding layer <C0> containing solar radiation shielding fine particles on the peeling layer <F> may be divided into a shielding layer <C'> having solar radiation shielding function and a shielding layer <C"> containing solar radiation shielding fine particles having shielding property different from that of the shielding layer <C'>.

Embodiment α-6 can reduce thickness of the shielding layer <C0> containing the solar radiation shielding fine particles on the peeling layer <F>, or the shielding layer <C'> having solar radiation shielding function and the shielding layer <C"> containing the solar radiation shielding fine particles having solar radiation shielding property different from that of the shielding layer <C'> having solar radiation shielding function. Further, by adding appropriate additives to the peeling layer <F> or the adhesive layer <E> can impart functions such as color tone adjustment.

Embodiment β-6

Embodiment β-6 uses a laminated sheet <2> containing the solar radiation shielding fine particles as at least one laminated sheet, in which the interlayer <10> is constituted by stacking an adhesive layer <E>, a shielding layer <C> containing the fine particles, and a peeling layer <F> in this order to obtain a laminate, bonding the adhesive layer <E> of the laminate on an inner surface of one of the two laminated sheet selected from the glass sheet and resin board, and further stacking an intermediate film or two or more intermediate films on the peeling layer <F> of the laminate, and the interlayer <10> is sandwiched between the laminated sheets to constitute the laminated structure. That is, the laminated structure has a structure including one laminated sheet/an adhesive layer <E>/a shielding layer <C> containing the solar radiation shielding fine particles/a peeling layer <F>/an intermediate film or two or more intermediate films/other laminated sheet (See FIG. 8(β)).

The laminated structure according to Embodiment β-6 can be produced in the same manner as Embodiment α-6, except that at least one of the two laminated sheets <1> not containing the solar radiation shielding fine particles is replaced with a laminated sheet <2> containing solar radiation shielding fine particles. It is sufficient to select and constitute the above-described constitution so that at least one or more kinds of fine particles at least having solar radiation shielding function are contained in the interlayer and laminated sheet <2> containing the solar radiation shielding fine particles of the laminated structure of the embodiment.

By this method also, it is possible to easily produce a thin solar radiation shielding layer. Further, adding appropriate additives to the peeling layer <F> or the adhesive layer <E> can impart functions such as color tone adjustment.

Embodiment β-7

Figure 9:
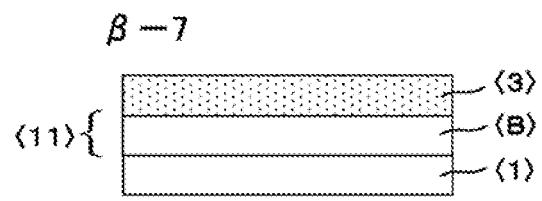
FIG. 9(β) illustrates a schematic view of a cross-section of a laminated structure according to an embodiment (β-7).

Embodiment β-7 is a laminated structure using a laminated sheet <3> containing the solar radiation shielding fine particles as at least one laminated sheet, in which an interlayer <11> includes a resin sheet <B> not containing the solar radiation shielding fine particles and is sandwiched between the laminated sheet <3> containing the solar radiation shielding fine particles and the laminated sheet <1> not containing the solar radiation shielding fine particles (See FIG. 9).

It is sufficient to select and constitute the laminated structure according to Embodiment β-7 so that at least one or more kinds of fine particles at least having solar radiation shielding function are contained in the laminated sheet <3> containing the solar radiation shielding fine particles.

For example, a solar radiation shielding laminated structure in which the interlayer <11> is constituted by a resin sheet <B> containing vinyl resin and not containing the solar radiation shielding fine particles is produced as follows, for example. A plasticizer is added to a vinyl resin to prepare a vinyl resin composition. The vinyl resin composition is formed into a sheet to obtain a resin sheet for an intermediate film. It is sufficient to use a resin board <3> containing the solar radiation shielding fine particles having solar radiation shielding function as at least one laminated sheet of the intermediate film sheet, and to use a laminated sheet <1> not containing the fine particles as the other laminated sheet.

This method can produce a solar radiation shielding laminated structure having high solar radiation shielding property and a low haze value. Furthermore, this method can easily produce a solar radiation shielding laminated structure at inexpensive production costs. Further, by adding suitable additives to the resin board of the intermediate film or the other laminated sheet, functions such as color tone adjustment, and the like can be imparted.

EXAMPLES

Hereinafter, the present invention will be specifically described with reference to examples. However, the present invention is not limited to the examples described below. Note that, in the examples and comparative examples, a term "solar radiation shielding laminated structure" is abbreviated to "laminated structure".

It should be noted that powder color (a field of view: 10°, a light source D65) of calcium lanthanum hexaboride fine particles and composite tungsten oxide fine particles, and visible light transmittance and solar radiation transmittance of the laminated structure in respective examples, are measured by a spectrophotometer U-4000 manufactured by Hitachi Co., Ltd. The haze value was measured using HR-200 manufactured by Murakami Color Research Laboratory.

Example 1

The calcium lanthanum boride fine particles were produced by a carbonic reduction method using lanthanum dioxide $La_2O_3$ and calcium oxide CaO. Specifically, lanthanum dioxide $La_2O_3$, calcium oxide CaO, boron oxide $B_2O_3$, and graphite powder C were weighed in a molar ratio of 3:2:26:72, and well mixed in a small-sized vacuum grinding machine (16-Z, manufactured by ISHIKAWA KOJO Co., Ltd.) to obtain mixed powder. The obtained mixed powder was placed in a tubular furnace, the temperature was raised at 300° C./hour in vacuum, kept at 1600° C. for 25 hours, and then, after the furnace was turned off, allowed to cool spontaneously to room temperature to obtain powder. The molar ratio of boron oxide, the ideal ratio value being 24, was intentionally set to 26 to compensate for the loss due to volatilization.

The obtained powder had a dark blue purple-colored appearance. As a result of XRD measurement, the same body-centered cubic single phase diffraction pattern as that of $LaB_6$ was obtained. The composition analysis performed by SEM-EDX showed an analysis result of approximately Ca:La:B=1:3:24 (atomic ratio). The element mapping images of Ca, La, and B indicated that these elements existed uniformly. According to the results, it was confirmed that powder having a composition of $Ca_{0.25}La_{0.75}B_6$ was produced.

Five mass % of the obtained $Ca_{0.25}La_{0.75}B_6$ powder, 5 mass % of a polymeric dispersant, and 90 mass % of dipropylene glycol monomethyl ether were weighed and charged in a paint shaker (manufactured by Asada Iron Works Co., Ltd.) containing 0.5 mm$\varphi$ $ZrO_2$ beads, subjected to pulverization and dispersion treatment for 10 hours and temporarily collected. Then, pulverization and dispersion treatment was further performed using 0.1 mm$\varphi$ $ZrO_2$ beads for 16 hours to prepare a dispersion liquid for intermediate film formation (dispersion liquid A1). For calcium lanthanum boride fine particles in the dispersion liquid A1, a small-angle X-ray scattering method was employed, and relation between $q=4\pi \sin \theta/\lambda$ and the scattering intensity I(q) was double-logarithmically plotted to evaluate the fine particle shape. Ve=−2.8 was obtained, and the shape was found to be strongly disc-like. Further, the fine particle shape of the obtained fine particles having a composition $Ca_{0.25}La_{0.75}B_6$ was observed with a transmission electron microscope and the long and short axes of 50 fine particles were measured. The average shape was determined to be a disc-like cylinder or a disc-like spheroid with an aspect ratio d/h=9.4. Further, the dispersion particle size of the calcium lanthanum boride fine particles was measured to be 26 nm.

The obtained dispersion liquid A1 was added to polyvinylbutyral, to which triethylene glycol-di-2-ethylbutyrate was added as a plasticizer, and the composition A2 for an intermediate film formation was prepared so that the concentration of the calcium lanthanum boride fine particles was 0.005 mass % and the concentration of the polyvinyl butyral was 69.7 mass %, the balance being the plasticizer. The prepared composition A2 was kneaded at 200° C. using a twin screw extruder, and an intermediate film of a 0.76 mm thick sheet was prepared from the T die by an extrusion calendar roll method.

The prepared intermediate film was sandwiched between two pieces of clear glass substrates of 100 mm×100 mm×about 2 mm in thickness and heated to 80° C. to be temporarily adhered. Then, final bonding was performed using an autoclave of 140° C. and 14 kgf/cm² to prepare a laminated structure A3.

The measurement of the optical properties of the obtained laminated structure A3 showed a transmission profile in which the transmittance in the visible light region was high and a valley was present due to strong absorption at a wavelength around 1239 nm in the near-infrared region. The visible light transmittance was 71.9%, the solar radiation transmittance was 47.4%, and the haze value was 0.9%.

Tables 1 and 2 illustrate the production conditions and measurement results of the solar radiation shielding fine particle dispersion liquid, the dispersion liquid for intermediate film formation, and the laminated structure according to Example 1 described above.

Tables 1 and 2 illustrate similarly for Examples 2 to 9 and Comparative Examples 1 and 2.

Example 2

A laminated structure B3 according to Example 2 was produced in the same manner as in Example 1, except that one of the two pieces of clear glass of the laminated structure A3 according to Example 1 was replaced with polycarbonate resin. The measurement of the optical properties of the obtained laminated structure B3 showed a transmission profile in which the transmittance in the visible light region was high and a valley was present due to strong absorption at a wavelength of around 1241 nm in the near-infrared region similarly to Example 1. The visible light transmittance was 72.8%, the solar radiation transmittance was 48.1%, and the haze value was 0.8%.

Example 3

The calcium lanthanum boride fine particles were produced by a $B_4C$ reduction method using lanthanum dioxide $La_2O_3$ and calcium oxide CaO. Specifically, calcium oxide CaO, lanthanum dioxide $La_2O_3$, and boron carbide $B_4C$ were weighed so that Ca:La=1:7 and (Ca+La):B=1:6 (atomic ratio), and well mixed in a small-sized vacuum grinding machine (16-Z, manufactured by ISHIKAWA KOJO Co., Ltd.) to obtain mixed powder. The obtained mixed powder was placed in a tubular furnace, the temperature was raised at 300° C./hour in vacuum, kept at 1600° C. for 25 hours, and then, after the furnace was turned off, allowed to cool to room temperature to obtain powder.

The obtained powder had a dark blue purple-colored appearance. As a result of XRD measurement, the same body-centered cubic single phase diffraction pattern as that of $LaB_6$ was obtained. The composition analysis performed by SEM-EDX showed an analysis result of approximately Ca:La:B=1:7:48 (atomic ratio). The element mapping images of Ca, La, and B indicated that these elements existed uniformly. From these results, it was confirmed that powder having a composition of $Ca_{0.125}La_{0.875}B_6$ was produced.

A dispersion liquid for solar radiation shield formation (dispersion liquid C1) was produced in the same manner as in Example 1 using the obtained $Ca_{0.125}La_{0.875}B_6$ powder. For calcium lanthanum boride fine particles in the dispersion liquid C1, a small-angle X-ray scattering method was employed, and relation between $q=4\pi \sin \theta/\lambda$ and the scattering intensity I(q) was double-logarithmically plotted to evaluate the fine particle shape. Ve=−2.9 was obtained, and the shape was found to be strongly disc-like. Further, the fine particle shape of the obtained composition $Ca_{0.125}La_{0.875}B_6$ was observed with a transmission electron microscope, and the long and short axes of 50 fine particles were measured. The average shape was determined to be a disc-like cylinder or a disc-like spheroid with an aspect ratio d/h=7.8. Further, the dispersed particle size of the calcium lanthanum boride fine particles in the dispersion liquid C1 was 34 nm.

Using the obtained dispersion liquid C1, a composition C2 for an intermediate film was prepared in the same manner as in Example 1. In the same manner as in Example 1 using the prepared composition C2, kneading was performed at 200° C. using a twin screw extruder, and a sheet-like intermediate film of a 0.76 mm thickness was prepared from the T die by an extrusion calendar roll method. Using the produced intermediate film, a laminated structure C3 according to Example 3 having the same form as that of Example 1 was prepared.

The measurement of the optical properties of the obtained laminated structure C3 showed a transmission profile in which the transmittance in the visible light region was high and a valley was present due to strong absorption at a wavelength around 1164 nm in the near-infrared region. The visible light transmittance was 68.1%, the solar radiation transmittance was 46.3%, and the haze value was 0.9%.

Example 4

The calcium lanthanum boride fine particles were produced by a $B_4C$ reduction method using lanthanum dioxide $La_2O_3$ and calcium oxide CaO. Specifically, calcium oxide CaO, lanthanum dioxide $La_2O_3$, and boron carbide $B_4C$ were weighed so that Ca:La=1:1 and (Ca+La):B=1:6 (atomic ratio), and well mixed in a small-sized vacuum grinding machine (16-Z, manufactured by ISHIKAWA KOJO Co., Ltd.) to obtain mixed powder. The obtained mixed powder was placed in a tubular furnace, the temperature was raised at 300° C./hour in vacuum, kept at 1600° C. for 25 hours, and then, after the furnace was turned off, allowed to cool to room temperature to obtain powder.

The obtained powder had a dark blue purple-colored appearance. As a result of XRD measurement, the same body-centered cubic single phase diffraction pattern as that of $LaB_6$ was obtained. The composition analysis performed by SEM-EDX showed an analysis result of approximately Ca:La:B=1:1:12 (atomic ratio). The element mapping images of Ca, La, and B indicated that these elements existed uniformly. From these results, it was confirmed that powder having a composition of $Ca_{0.5}La_{0.5}B_6$ was produced.

A dispersion liquid for solar radiation shield formation (dispersion liquid D1) was produced in the same manner as in Example 1 using the obtained $Ca_{0.5}La_{0.5}B_6$ powder. For calcium lanthanum boride fine particles in the dispersion liquid D1, a small-angle X-ray scattering method was employed, and relation between $q=4\pi \sin \theta/\lambda$ and the scattering intensity I(q) was double-logarithmically plotted to evaluate the fine particle shape. Ve=−3.2 was obtained, and the shape was found to be strongly disc-like. Further, the fine particle shape of the obtained composition $Ca_{0.5}La_{0.5}B_6$ was observed with a transmission electron microscope, and the long and short axes of 50 fine particles were measured. The average shape was determined to be a disc-like cylinder or a disc-like spheroid with an aspect ratio d/h=4.1. Further, the dispersed particle size of the calcium lanthanum boride fine particles in the dispersion liquid D1 was 36 nm.

Using the obtained dispersion liquid D1, a composition D2 for an intermediate film was prepared in the same manner as in Example 1. In the same manner as in Example 1 using the prepared composition D2, kneading was performed at 200° C. using a twin screw extruder, and a sheet-like intermediate film of a 0.76 mm thickness was prepared from the T die by an extrusion calendar roll method. Using the prepared intermediate film, a laminated structure D3 according to Example 4 having the same form as that of Example 1 was prepared.

The measurement of the optical properties of the obtained laminated structure D3 showed a transmission profile in which the transmittance in the visible light region was high and a valley was present due to strong absorption at a wavelength around 1508 nm in the near-infrared region. The visible light transmittance was 70.4%, the solar radiation transmittance was 47.0%, and the haze value was 1.0%.

Example 5

The calcium lanthanum boride fine particles were produced by a $B_4C$ reduction method using lanthanum dioxide $La_2O_3$ and calcium oxide CaO. Specifically, calcium oxide CaO, lanthanum dioxide $La_2O_3$, and boron carbide $B_4C$ were weighed so that Ca:La=3:1 and (Ca+La):B=1:6 (atomic ratio), and well mixed in a small-sized vacuum grinding machine (16-Z, manufactured by ISHIKAWA KOJO Co., Ltd.) to obtain mixed powder. The obtained mixed powder was placed in a tubular furnace, the temperature was raised at 300° C./hour in vacuum, kept at 1600° C. for 25 hours, and then, after the furnace was turned off, allowed to cool to room temperature to obtain powder.

The obtained powder had a dark blue purple-colored appearance. As a result of XRD measurement, the same body-centered cubic single phase diffraction pattern as that of $LaB_6$ was obtained. The composition analysis performed by SEM-EDX provided an analysis result of approximately Ca:La:B=3:1:24 (atomic ratio). The element mapping images of Ca, La, and B indicated that these elements existed uniformly. From these results, it was confirmed that powder having a composition of $Ca_{0.75}La_{0.25}B_6$ was produced.

A dispersion liquid for solar radiation shield formation (dispersion liquid E1) was produced in the same manner as in Example 1 using the obtained $Ca_{0.75}La_{0.25}B_6$ powder. For calcium lanthanum boride fine particles in the dispersion liquid E1, a small-angle X-ray scattering method was employed, and relation between $q=4\pi \sin \theta/\lambda$ and the scattering intensity I(q) was double-logarithmically plotted to evaluate the fine particle shape. Ve=−3.0 was obtained, and the shape was found to be strongly disc-like. Further, the fine particle shape of the obtained composition $Ca_{0.75}La_{0.25}B_6$ was observed with a transmission electron microscope, and the long and short axes of 50 fine particles were measured. The average shape was determined to be a disc-like cylinder or a disc-like spheroid with an aspect ratio d/h=5.9. Further, the dispersed particle size of the calcium lanthanum boride fine particles in the dispersion liquid E1 was 27 nm.

Using the obtained dispersion liquid E1, a composition E2 for an intermediate film was prepared in the same manner as in Example 1. In the same manner as in Example 1 using the prepared composition E2, kneading was performed at 200° C. using a twin screw extruder, and a sheet-like intermediate film of a 0.76 mm thickness was prepared from the T die by an extrusion calendar roll method. Using the produced intermediate film, a laminated structure E3 according to Example 5 having the same form as that of Example 1 was prepared. The measurement of the optical properties of the obtained laminated structure E3 showed a transmission profile in which the transmittance in the visible light region was high and a valley was present due to strong absorption at a wavelength of 1818 nm in the near-infrared region. The visible light transmittance was 69.5%, the solar radiation transmittance was 49.8%, and the haze value was 0.8%.

Example 6

In the same manner as in Example 4, the calcium lanthanum boride fine particles were produced by a $B_4C$ reduction method using lanthanum dioxide $La_2O_3$ and calcium oxide CaO. The obtained powder had a dark blue purple-colored appearance. As a result of XRD measurement, the same body-centered cubic single phase diffraction pattern as that of $LaB_6$ was obtained. According to the composition analysis performed by SEM-EDX, it was confirmed that powder having a composition of $Ca_{0.5}La_{0.5}B_6$ was produced.

Next, 5 mass % of the obtained $Ca_{0.5}La_{0.5}B_6$ powder, 5 mass % of a polymeric dispersant, and 90 mass % of dipropylene glycol monomethyl ether were weighed and charged in a paint shaker (manufactured by Asada Iron Works Co., Ltd.) containing 0.5 mmφ $ZrO_2$ beads, subjected to pulverization and dispersion treatment for 10 hours and temporarily collected. Then, pulverization and dispersion treatment was further performed using 0.1 mmφ $ZrO_2$ beads for 16 hours to prepare a dispersion liquid for intermediate film formation (dispersion liquid D1). For calcium lanthanum boride fine particles in the dispersion liquid D1, a small-angle X-ray scattering method was employed, and relation between $q=4\pi \sin \theta/\lambda$ and the scattering intensity I(q) was double-logarithmically plotted to evaluate the fine particle shape. Ve=−3.1 was obtained, and the shape was found to be strongly disc-like. Further, the fine particle shape of the obtained fine particles having a composition $Ca_{0.5}La_{0.5}B_6$ was observed with a transmission electron microscope and the long and short axes of 50 fine particles were measured. The average shape was determined to be a disc-like cylinder or a disc-like spheroid with an aspect ratio d/h=5.0. Further, the dispersed particle size of the calcium lanthanum boride fine particles in the dispersion liquid D1 was 36 nm.

On the other hand, 10.8 g of cesium carbonate was dissolved in 16.5 g of water, and this solution was added to 50 g of tungstic acid. After sufficiently stirred, it was dried. The thus-obtained dried substance was heated while supplying 2% $H_2$ gas, using nitrogen gas as a carrier to fire for 30 minutes at a temperature of 800° C. and black powder was obtained by firing for 90 minutes at 800° C. under nitrogen gas atmosphere. As a result of crystal phase identification of the obtained powder by the powder X-ray diffraction method, it was found to be $Cs_{0.33}WO_3$ single phase.

Ten mass % of the obtained cesium tungsten bronze powder, 5 mass % of a polymeric dispersant, and 85 mass % of dipropylene glycol monomethyl ether were weighed and charged in a paint shaker (manufactured by Asada Iron Works Co., Ltd.) containing 0.5 mmφ $ZrO_2$ beads, subjected to pulverization and dispersion treatment for 10 hours and temporarily collected. Then, pulverization and dispersion treatment was further performed using 0.1 mmφ $ZrO_2$ beads for 8 hours to prepare a dispersion liquid for intermediate film formation (dispersion liquid F1). The dispersed particle size of the cesium tungsten bronze fine particles in the dispersion liquid F1 was measured to 23 nm.

The dispersion liquid D1 of the obtained calcium lanthanum boride $Ca_{0.5}La_{0.5}B_6$ fine particles and the dispersion liquid F1 of cesium tungsten bronze $Cs_{0.33}WO_3$ were mixed at a mass ratio of 1:5 to obtain a mixed dispersion liquid (mixed dispersion liquid DF1). The obtained mixed dispersion liquid DF1 was added to polyvinyl butyral, to which triethylene glycol-di-2-ethylbutyrate was added as a plasticizer, and the composition F2 for an intermediate film was prepared so that the total concentration of the two kinds of solar radiation shielding fine particles was 0.024 mass % and the concentration of the polyvinyl butyral was 69.7 mass %.

In the same manner as in Example 1 using the prepared composition F2, kneading was performed at 200° C. using a twin screw extruder, and a sheet-like intermediate film of a 0.76 mm thickness was prepared from the T die by an extrusion calendar roll method. Using the prepared intermediate film, a laminated structure F3 according to Example 6 having the same form as that of Example 1 was prepared. The measurement of the optical properties of the obtained laminated structure F3 showed a transmission profile in which the transmittance in the visible light region was high and there was a bottom at a wavelength around 1505 nm in the near-infrared region and there is an influence from strong absorption on the longer wavelength side. The visible light transmittance was 73.0%, the solar radiation transmittance was 46.7%, and the haze value was 1.1%.

Example 7

2.7 mass % of the calcium lanthanum boride $Ca_{0.75}La_{0.25}B_6$ fine particles obtained in Example 5, 5.1 mass % of a polymeric dispersant, 7.7 mass % of an acrylic resin, and 84.5 mass % of methyl isobutyl ketone were weighed and charged in a paint shaker (manufactured by Asada Iron Works Co., Ltd.) containing 0.5 mmφ $ZrO_2$ beads, subjected to pulverization and dispersion treatment for 10 hours and temporarily collected. Then, pulverization and dispersion treatment was further performed using 0.1 mmφ $ZrO_2$ beads for 16 hours to prepare a dispersion liquid for intermediate film formation (dispersion liquid G1). The dispersed particle size of the calcium lanthanum boride fine particles in the obtained dispersion liquid G1 was measured to be 27 nm.

After coating the obtained dispersion liquid G1 on a clear glass substrate of 100 mm×100 mm×about 2 mm in thickness using a bar coater (count 24), it was fired at 180° C. for one hour to form a solar radiation shielding layer which is to be an intermediate film.

An ethylene-vinyl acetate copolymer sheet for an intermediate film having a thickness of 0.76 mm was sandwiched between a solar radiation shielding layer formed on the obtained clear glass as an intermediate film and a PET film having a thickness of 50 μm as one of the laminated sheets, to prepare a laminated structure (bilayer glass) having a structure of clear glass/solar radiation shielding layer/ethylene-vinyl acetate copolymer sheet/PET film. The obtained structure was heated to 80° C. to be temporarily adhered. Then, final bonding was performed using an autoclave of 140° C. and 14 kgf/$cm^2$ to prepare a laminated structure G3 according to Example 7. The measurement of the optical properties of the obtained laminated structure G3 showed a transmission profile in which the transmittance in the visible light region was high and a valley was present due to strong absorption at a wavelength around 1825 nm in the near-infrared region. The visible light transmittance was 71.2%, the solar radiation transmittance was 50.3%, and the haze value was 0.8%.

Example 8

In the same manner as in Example 5, a calcium lanthanum boride powder was prepared by a $B_4C$ reduction method using lanthanum dioxide $La_2O_3$ and calcium oxide CaO.

As a result of XRD measurement of the obtained powder, the same body-centered cubic single phase diffraction pattern as that of $LaB_6$ was obtained. The composition analysis performed by SEM-EDX showed an analysis result of approximately Ca:La:B=3:1:24 (atomic ratio). The element mapping images of Ca, La, and B indicated that these elements existed uniformly. From these results, it was confirmed that powder having a composition of $Ca_{0.75}La_{0.25}B_6$ was produced.

Using the obtained $Ca_{0.75}La_{0.25}B_6$ powder, 5 mass % of the calcium lanthanum boride powder, 5 mass % of a polymeric dispersant, and 90 mass % of dipropylene glycol monomethyl ether were weighed and charged in a paint shaker (manufactured by Asada Iron Works Co., Ltd.) containing 0.5 mmφ $ZrO_2$ beads, subjected to pulverization and dispersion treatment for 5 hours to prepare a dispersion liquid for intermediate film formation (dispersion liquid H1). The dispersed particle size of the calcium lanthanum boride fine particles in the obtained dispersion liquid H1 was measured to be 95 nm. For calcium lanthanum boride fine particles in the dispersion liquid H1, a small-angle X-ray scattering method was employed, and relation between $q=4\pi \sin \theta/\lambda$ and the scattering intensity $I(q)$ was double-logarithmically plotted to evaluate the fine particle shape. $Ve=-2.8$ was obtained, and the shape was found to be strongly disc-like. Further, the fine particle shape of the obtained fine particles having a composition $Ca_{0.125}La_{0.875}B_6$ was observed with a transmission electron microscope and the long and short axes of 50 fine particles were measured. As a result, the average shape was determined to be a disc-like cylinder or a disc-like spheroid with an aspect ratio $d/h=10.6$.

Using the obtained dispersion liquid H1, a composition $H_2$ for an intermediate film was prepared in the same manner as in Example 1. In the same manner as in Example 1 using the prepared composition $H_2$, kneading was performed at 200° C. using a twin screw extruder, and a sheet-like intermediate film of a 0.76 mm thickness was prepared from the T die by an extrusion calendar roll method. Using the prepared intermediate film, a laminated structure H3 according to Example 8 having the same form as that of Example 1 was prepared. The measurement of the optical properties of the obtained laminated structure H3 showed a transmission profile in which the transmittance in the visible light region was high and a valley was present due to strong absorption at a wavelength around 1816 nm in the near-infrared region. The visible light transmittance was 68.9%, the solar radiation transmittance was 50.6%, and the haze value was 5.3%.

Example 9

A composition 12 for an intermediate film according to Example 9 was obtained in the same manner as in Example 1 except that in place of polyvinyl butyral as a resin material of the composition A2 for the intermediate film according to Example 1, ethylene-vinyl acetate copolymer was used. A laminated structure 13 with the same constitution as that of Example 1 was prepared using the obtained composition 12 for an intermediate film. The measurement of the optical properties of the obtained laminated structure 13 showed a transmission profile in which the transmittance in the visible light region was high and a valley was present due to strong absorption at a wavelength around 1242 nm in the near-infrared region. The visible light transmittance was 70.4%, the solar radiation transmittance was 46.6%, and the haze value was 0.8%.

Comparative Example 1

The lanthanum boride was produced by a $B_4C$ reduction method using lanthanum dioxide $La_2O_3$. Specifically, lanthanum dioxide $La_2O_3$ and boron carbide $B_4C$ were weighed so that La:B=1:6 (atomic ratio), and well mixed in a small-sized vacuum grinding machine (16-Z, manufactured by ISHIKAWA KOJO Co., Ltd.) to obtain mixed powder. The obtained mixed powder was placed in a tubular furnace, the temperature was raised at 300° C./hour in vacuum, kept at 1600° C. for 8 hours, and then, after the furnace was turned off, allowed to cool spontaneously to room temperature to obtain powder.

The powder and metal boron B were mixed at a molar ratio of 15:85 to obtain powder, which was used as a raw material. The lanthanum boride fine particles were prepared using a hybrid plasma apparatus superimposing DC plasma and high-frequency plasma. The reactor was evacuated to vacuum of 0.1 Pa, then completely replaced with Ar gas, and DC plasma was generated by applying DC voltage at 6 kW while flowing Ar gas at 8 L/min. Ar gas at 40 L/min and hydrogen gas at 3 L/min were flowed from a sheath gas supply port, and high-frequency electric power of 45 kW was applied to generate high-frequency plasma. The mixed powder was fed at a rate of 2 g/min into a hybrid plasma flame along with a carrier gas (Ar gas at 3 liter/min) to collect lanthanum boride fine particles from a filter.

The obtained powder had a black-colored appearance. As a result of XRD measurement, it was identified as $LaB_6$. Next, a dispersion liquid for intermediate film formation (dispersion liquid J1) was prepared in the same manner as in Example 1 using the obtained $LaB_6$ powder. For lanthanum boride fine particles in the dispersion liquid J1, a small-angle X-ray scattering method was employed, and relation between $q=4\pi \sin \theta/\lambda$ and the scattering intensity $I(q)$ was double-logarithmically plotted to evaluate the fine particle shape. $Ve=-3.9$ was obtained, and the shape was found to be almost spherical. Further, according to the observation of the fine particle shape of the obtained $LaB_6$ composition with a transmission electron microscope, it was found to be spherical fine particle of a size of 10 to 50 nm. According to the measurement of the long and short axes of 50 particles, regarding the average shape, they were determined to be spherical fine particles with an aspect ratio $d/h=1.1$.

Further, the dispersed particle size of the lanthanum boride fine particles was measured to be 29 nm. Next, using the obtained dispersion liquid J1, composition J2 for an intermediate film was prepared in the same manner as in Example 1. In the same manner as in Example 1 using the prepared composition J2, kneading was performed at 200° C. using a twin screw extruder, and a sheet-like intermediate film of a 0.76 mm thickness was prepared from the T die by an extrusion calendar roll method. Using the prepared intermediate film, a laminated structure J3 according to Comparative Example 1 having the same form as that of Example 1 was prepared. The measurement of the optical properties of the obtained laminated structure J3 showed a transmission profile in which the transmittance in the visible light region was high and a valley was present due to strong absorption at a wavelength around 1004 nm in the near-infrared region. The visible light transmittance was 71.3%, the solar radiation transmittance was 59.3%, and the haze value was 0.9%. The wavelength width of the absorption band was narrow, and the near-infrared absorption effect was more limited compared to that in Examples. This laminated structure had stronger green color tone as compared with the laminated structure of the above Examples.

Comparative Example 2

The calcium boride was produced by a $B_4C$ reduction method using calcium oxide CaO. Specifically, calcium oxide CaO and boron carbide $B_4C$ were weighed so that Ca:B=1:6 (atomic ratio), and well mixed in a small-sized vacuum grinding machine (ISHIKAWA KOJO Co., Ltd. 16-Z) to give a mixed powder. The obtained mixed powder was placed in a tubular furnace, the temperature was raised at 300° C./hour in vacuum, kept at 1600° C. for 8 hours, and then, after the furnace was turned off, allowed to cool to room temperature to obtain powder. The obtained powder had a black-colored appearance. As a result of XRD measurement, it was identified as $CaB_6$.

A dispersion liquid for intermediate film formation (dispersion liquid K1) was prepared in the same manner as in Example 1 using the obtained $CaB_6$ powder. For calcium lanthanum boride fine particles in the dispersion liquid K1, a small-angle X-ray scattering method was employed, and relation between $q=4\pi \sin \theta/\lambda$ and the scattering intensity I(q) was double-logarithmically plotted to evaluate the fine particle shape. Ve=−3.0 was obtained, and the shape was found to be strongly disc-like. Further, the fine particle shape of the obtained $CaB_6$ composition was observed with a transmission electron microscope, and the long and short axes of 50 fine particles were measured. The average shape was determined to be a disc-like cylinder or a disc-like spheroid with an aspect ratio d/h=3.8. Further, the dispersed particle size of the calcium boride fine particles was measured to be 33 nm.

Using the obtained dispersion liquid K1, a composition K2 for an intermediate film was prepared in the same manner as in Example 1. In the same manner as in Example 1 using the prepared composition K2, kneading was performed at 200° C. using a twin screw extruder, and a sheet-like intermediate film of a 0.76 mm thickness was prepared from the T die by an extrusion calendar roll method. Using the prepared intermediate film, a laminated structure K3 according to Comparative Example 2 having the same form as that of Example 1 was prepared. The optical properties of the obtained laminated structure K3 were measured. As a result, high transmittance in the visible light region and a weak absorption in the infrared range were observed. The bottom of the transmittance due to absorption was apparently on the long wavelength side beyond 2600 nm. Therefore, FTIR measurement was employed to find that the absorption bottom was located at a wavelength around 4260 nm in the mid-infrared region. The visible light transmittance was 73.3%, the solar radiation transmittance was 65.5%, and the haze value was 1.0%. This laminated structure had extremely reduced solar radiation shielding characteristics as compared with the laminated structure of the above Examples.

TABLE 1

SOLAR RADIATION SHIELDING FINE PARTICLE DISPERSION LIQUID

| | | SOLAR RADIATION SHIELDING FINE PARTICLES | | | | | |
|---|---|---|---|---|---|---|---|
| | | | FINE PARTICLE SHAPE | | | | |
| | | COMPOSITION | Ve | ASPECT RATIO d/h | | SOLVENT | RESIN MATERIAL | POLYMERIC DISPERSANT |
| EXAMPLE 1 | DISPERSION LIQUID A1 | $Ca_{0.25}La_{0.75}B_6$ 5 MASS % | −2.8 | 9.4 | 26 nm | DIPROPYLENE GLYCOL | | POLYMERIC DISPERSANT 5 MASS % |
| EXAMPLE 2 | DISPERSION LIQUID A1 | | SAME AS ABOVE | SAME AS ABOVE | SAME AS ABOVE | MONOMETHYL ETHER | | |
| EXAMPLE 3 | DISPERSION LIQUID C1 | $Ca_{0.25}La_{0.75}B_6$ 5 MASS % | −2.7 | 7.8 | 34 nm | 90 MASS % | | |
| EXAMPLE 4 | DISPERSION LIQUID D1 | $Ca_{0.5}La_{0.5}B_6$ 5 MASS % | −3.2 | 4.1 | 36 nm | | | |
| EXAMPLE 5 | DISPERSION LIQUID E1 | $Ca_{0.75}La_{0.25}B_6$ 5 MASS % | −3.0 | 5.9 | 27 nm | | | |
| EXAMPLE 6 | DISPERSION LIQUID D1 | $Ca_{0.5}La_{0.5}B_6$ 5 MASS % | −3.1 | 5.0 | 36 nm | | | |
| | DISPERSION LIQUID F1 | $Ca_{0.33}WO_3$ 10 MASS % | | | 23 nm | DIPROPYLENE GLYCOL MONOMETHYL ETHER 85 MASS % | | |
| EXAMPLE 7 | DISPERSION LIQUID G1 | $Ca_{0.75}La_{0.25}B_6$ 2.7 MASS % | −3.0 | 5.9 | 27 nm | METHYL ISOBUTYL KETONE 84.5 MASS % | ACRYLIC RESIN 7.7 MASS % | POLYMERIC DISPERSANT 5.1 MASS % |
| EXAMPLE 8 | DISPERSION LIQUID H1 | $Ca_{0.75}La_{0.25}B_6$ 5 MASS % | −2.8 | 10.5 | 95 nm | DIPROPYLENE GLYCOL | | POLYMERIC DISPERSANT 5 MASS % |
| EXAMPLE 9 | DISPERSION LIQUID A1 | $Ca_{0.25}La_{0.75}B_6$ 5 MASS % | −2.8 | 9.4 | 26 nm | MONOMETHYL ETHER 90 MASS % | | |
| COMPARATIVE EXAMPLE 1 | DISPERSION LIQUID J1 | $LaB_6$ 5 MASS % | −3.9 | 1.3 | 29 nm | DIPROPYLENE GLYCOL | | POLYMERIC DISPERSANT |
| COMPARATIVE EXAMPLE 2 | DISPERSION LIQUID K1 | $CaB_6$ 5 MASS % | −3.9 | 3.8 | 33 nm | MONOMETHYL ETHER 90 MASS % | | 5 MASS % |

TABLE 1-continued

| | | COMPOSITION FOR INTERMEDIATE FILM | | | |
|---|---|---|---|---|---|
| | | | SOLAR RADIATION SHIELDING FINE PARTICLES | RESIN MATERIAL DISPERSANT | PLASTICIZER |
| EXAMPLE 1 | COMPOSITION A2 | $Ca_{0.25}La_{0.75}B_6$ 0.005 MASS % | POLYVINYL BUTYRAL 89.7 MASS % | TRIETHYLENE GLYCOL- DI-2-ETHYLBUTYLATE | |
| EXAMPLE 2 | COMPOSITION A2 | | | | |
| EXAMPLE 3 | COMPOSITION C2 | $Ca_{0.125}La_{0.875}B_6$ 0.005 MASS % | | | |
| EXAMPLE 4 | COMPOSITION D2 | $Ca_{0.5}La_{0.5}B_6$ 0.005 MASS % | | | |
| EXAMPLE 5 | COMPOSITION E2 | $Ca_{0.75}La_{0.25}B_6$ 0.005 MASS % | | | |
| EXAMPLE 6 | COMPOSITION F2 | $Ca_{0.5}La_{0.5}B_6$: $Cs_{0.35}WO_3$ = 1.5 TOTAL 0.024 MASS % | | | |
| EXAMPLE 7 | | | | | |
| EXAMPLE 8 | COMPOSITION H2 | $Ca_{0.75}La_{0.25}B_6$ 0.005 MASS % | POLYVINYL BUTYRAL 69.7 MASS % | TRIETHYLENE GLYCOL- DI-2-ETHYLBUTYLATE | |
| EXAMPLE 9 | COMPOSITION I2 | $Ca_{0.25}La_{0.75}B_6$ 0.005 MASS % | ETHYLENE- VINYL ACETATE COPOLYMER SHEET 69.7 MASS % | | |
| COMPARATIVE EXAMPLE 1 | COMPOSITION J2 | $LaB_6$ 0.005 MASS % | POLYVINYL BUTYRAL 69.7 MASS % | TRIETHYLENE GLYCOL- DI-2-ETHYLBUTYLATE | |
| COMPARATIVE EXAMPLE 2 | COMPOSITION K2 | $CaB_6$ 0.005 MASS % | | | |

TABLE 2

| | | | LAMINATED STRUCTURE | | | | |
|---|---|---|---|---|---|---|---|
| | | | INTERMEDIATE FILM 1 | | | | |
| | | EMBODIMENT | COMPOSITION FOR INTERMEDIATE FILM | FORMING METHOD | SHAPE | INTERMEDIATE FILM 2 MATERIAL, SHAPE | LAMINATED SHEET 1 MATERIAL, SHAPE |
| EXAMPLE 1 | LAMINATED STRUCTURE A3 | α-1 | A2 | TWIN SCREW EXTRUDER CALENDER ROLL METHOD | SHEET THICKNESS 0.76 mm | | CLEAR GLASS SUBSTRATE 100 mm × 100 mm × THICKNESS 2 mm |
| EXAMPLE 2 | LAMINATED STRUCTURE B3 | | A2 | | | | |
| EXAMPLE 3 | LAMINATED STRUCTURE C3 | | C2 | | | | |
| EXAMPLE 4 | LAMINATED STRUCTURE D3 | | D2 | | | | |
| EXAMPLE 5 | LAMINATED STRUCTURE E3 | | E2 | | | | |
| EXAMPLE 6 | LAMINATED STRUCTURE F3 | | F2 | | | | |
| EXAMPLE 7 | LAMINATED STRUCTURE G3 | α-3 | DISPERSANT LIQUID G1 | COATING | COATING LAYER/ CLEAR GLASS SUBSTRATE (THICKNESS 2 mm) | ETHYLENE - VINYL ACETATE COPOLYMER SHEET (THICKNESS 0.76 mm) | |

TABLE 2-continued

| | | | | | | |
|---|---|---|---|---|---|---|
| EXAMPLE 8 | LAMINATED STRUCTURE H3 | α-1 | COMPOSITION H2 | TWIN SCREW EXTRUDER CALENDER ROLL METHOD | SHEET THICKNESS 0.76 mm | |
| EXAMPLE 9 | LAMINATED STRUCTURE I3 | | COMPOSITION I2 | | | |
| COMPARATIVE EXAMPLE 1 | LAMINATED STRUCTURE J3 | α-1 | COMPOSITION J2 | TWIN SCREW EXTRUDER CALENDER ROLL METHOD | SHEET THICKNESS 0.76 mm | CLEAR GLASS SUBSTRATE 100 mm × 100 mm × THICKNESS 2 mm |
| COMPARATIVE EXAMPLE 2 | LAMINATED STRUCTURE K3 | | COMPOSITION K2 | | | |

| | LAMINATED STRUCTURE LAMINATED SHEET 2 MATERIAL, SHAPE | OPTICAL PROPERTIES | | | |
|---|---|---|---|---|---|
| | | WAVELENGTH OF VALLEY PORTION EXHIBITING STRONG ABSORPTION IN TRANSMISSION PROFILE | VISIBLE LIGHT TRANSMITTANCE | SOLAR RADIATION TRANSMITTANCE | HAZE |
| EXAMPLE 1 | CLEAR GLASS SUBSTRATE 100 mm × 100 mm × THICKNESS 2 mm | 1239 nm | 71.9% | 47.4% | 0.9% |
| EXAMPLE 2 | POLYCARBONATE PLATE 100 mm × 100 mm × THICKNESS 2 mm | 1241 nm | 72.2% | 48.1% | 0.8% |
| EXAMPLE 3 | CLEAR GLASS SUBSTRATE 100 mm × 100 mm × THICKNESS 2 mm | 1184 nm | 56.1% | 46.3% | 0.9% |
| EXAMPLE 4 | | 1808 nm | 70.4% | 47.0% | 3.0% |
| EXAMPLE 5 | | 1818 nm | 89.5% | 48.8% | 0.8% |
| EXAMPLE 6 | | 1505 nm | 73.0% | 46.7% | 1.1% |
| EXAMPLE 7 | PET FILM THICKNESS 50 μm | 1826 nm | 75.2% | 50.2% | 0.8% |
| EXAMPLE 8 | CLEAR GLASS SUBSTRATE 100 mm × 100 mm × THICKNESS 2 mm | 1515 nm | 58.9% | 60.8% | 3.3% |
| EXAMPLE 9 | | 1242 nm | 70.4% | 46.8% | 0.8% |
| COMPARATIVE EXAMPLE 1 | CLEAR GLASS SUBSTRATE 100 mm × 100 mm × THICKNESS 2 mm | 1004 nm | 71.3% | 58.3% | 0.9% STRONG GREEN COLOR TONE |
| COMPARATIVE EXAMPLE 2 | | 4280 nm | 73.3% | 85.3% | 3.0% |

DESCRIPTION OF REFERENCES NUMERALS

11 Boron atom
12 Element M
21 Thermal plasma
22 High frequency coil
23 Sheath gas supply nozzle
24 Plasma gas supply nozzle
25 Raw material powder supply nozzle
26 Reaction vessel
27 Suction tube
28 Filter

What is claimed is:

1. A solar radiation shielding laminated structure in which an interlayer is sandwiched between two laminated sheets;
the interlayer having, as an intermediate film, one or more kinds selected from a resin sheet containing solar radiation shielding fine particles and a resin film containing solar radiation shielding fine particles,
the laminated sheets being selected from a sheet-glass not containing solar radiation shielding fine particles and a resin board not containing solar radiation shielding fine particles;
wherein the solar radiation shielding fine particles are solar radiation shielding fine particles containing calcium lanthanum boride fine particles represented by general formula $Ca_xLa_{1-x}B_m$, value of x is in a range of $0.001 \leq x \leq 0.800$, and a value of m is in a range of $5.0 \leq m < 6.3$ in the general formula,
an average dispersed particle size of the calcium lanthanum boride fine particles is 1 nm or more and 800 nm or less, and
a fine particle shape of the calcium lanthanum boride fine particles is at least one shape selected from the following 1) and 2):
1) a shape in which a scattering intensity of the calcium lanthanum boride fine particles diluted and dispersed in a solvent measured using a small-angle X-ray scattering method is such that a slope value Ve of a straight line obtained by double-logarithmic plotting of a relationship between scattering vector $q = 4\pi \sin\theta/\lambda$ and scattering intensity $I(q)$ is in a range of $-3.8 \leq Ve \leq -1.5$;
2) a flat cylindrical (wherein a diameter of a bottom circle is d and a height of a cylinder is h) shape, or a spheroidal (wherein a length of a long axis is d and a length of a short axis is h) shape, with a value of aspect ratio d/h being in a range of 1.5≤d/h≤20.

2. A solar radiation shielding laminated structure
in which an interlayer is sandwiched between one laminated sheet and other laminated sheet;
the interlayer having one or more kinds of intermediate films selected from a resin sheet containing solar radiation shielding fine particles and a resin film containing solar radiation shielding fine particles and one or more kinds of intermediate films selected from a resin sheet not containing solar radiation shielding fine particles and a resin film not containing solar radiation shielding fine particles,
the one laminated sheet being selected from a sheet-glass not containing solar radiation shielding fine particles, a resin board not containing solar radiation shielding fine particles, and a resin board containing solar radiation shielding fine particles,
the other laminated sheet containing solar radiation shielding fine particles;
wherein the solar radiation shielding fine particles are solar radiation shielding fine particles containing calcium lanthanum boride fine particles represented by general formula $Ca_xLa_{1-x}B_m$, a value of x is in a range of 0.001≤x≤0.800, and a value of m is in a range of 5.0≤m<6.3 in the general formula,
an average dispersed particle size of the calcium lanthanum boride fine particles is 1 nm or more and 800 nm or less, and
a fine particle shape of the calcium lanthanum boride fine particles is at least one shape selected from the following 1) and 2):
1) a shape in which a scattering intensity of the calcium lanthanum boride fine particles diluted and dispersed in a solvent measured using a small-angle X-ray scattering method is such that a slope value Ve of a straight line obtained by double-logarithmic plotting of a relationship between scattering vector $q=4\pi \sin\theta/\lambda$ and scattering intensity I(q) is in a range of −3.8≤Ve≤−1.5;
2) a flat cylindrical (wherein a diameter of a bottom circle is d and a height of a cylinder is h) shape, or a spheroidal (wherein a length of a long axis is d and a length of a short axis is h) shape, with a value of aspect ratio d/h being in a range of 1.5≤d/h≤20.

3. The solar radiation shielding laminated structure according to claim 1,
wherein, when solar radiation shielding fine particles are included in two or more of the intermediate film and the laminated sheet, at least one layer includes solar radiation shielding fine particles containing the calcium lanthanum boride fine particles, and at least one of the other layer includes solar radiation shielding fine particles having solar radiation shielding property different from that of the solar radiation shielding fine particles.

4. The solar radiation shielding laminated structure according to claim 3,
wherein the solar radiation shielding fine particles having solar radiation shielding function different from that of the solar radiation shielding fine particles containing calcium lanthanum boride fine particles are at least one kind of solar radiation shielding fine particles selected from calcium lanthanum boride fine particles having solar radiation shielding function different from that of the calcium lanthanum boride fine particles, hexagonal crystal tungsten bronze fine particles, Sn-doped indium oxide fine particles, Sb-doped tin oxide fine particles, and Al-doped zinc oxide fine particles, and Ga-doped zinc oxide fine particles.

5. The solar radiation shielding laminated structure according to claim 1,
wherein the resin material forming the resin board, resin sheet, and resin film is one kind selected from polycarbonate resin, acrylic resin, and polyethylene terephthalate resin.

6. The solar radiation shielding laminated structure according to claim 1, wherein the resin material forming the interlayer is vinyl resin.

7. The solar radiation shielding laminated structure according to claim 6,
wherein the vinyl resin is polyvinyl butyral or ethylene-vinyl acetate copolymer.

8. A method for producing a solar radiation shielding laminated structure
in which an interlayer is sandwiched between two laminated sheets;
the interlayer having, as an intermediate film, one or more kinds selected from a resin sheet containing solar radiation shielding fine particles and a resin film containing solar radiation shielding fine particles,
the laminated sheets being selected from a sheet-glass not containing solar radiation shielding fine particles and a resin board not containing solar radiation shielding fine particles;
wherein the solar radiation shielding fine particles are solar radiation shielding fine particles containing calcium lanthanum boride fine particles represented by general formula $Ca_xLa_{1-x}B_m$, a value of x is in a range of 0.001≤x≤0.800, and a value of m is in a range of 5.0≤m<6.3 in the general formula,
an average dispersed particle size of the calcium lanthanum boride fine particles is 1 nm or more and 800 nm or less,
a fine particle shape of the calcium lanthanum boride fine particles is at least one shape selected from the following 1) and 2):
1) a shape in which a scattering intensity of the calcium lanthanum boride fine particles diluted and dispersed in a solvent measured using a small-angle X-ray scattering method is such that a slope value Ve of a straight line obtained by double-logarithmic plotting of a relationship between scattering vector $q=4\pi \sin\theta/\lambda$ and scattering intensity I(q) is in a range of −3.8≤Ve≤−1.5;
2) a flat cylindrical (wherein a diameter of a bottom circle is d and a height of a cylinder is h) shape, or a spheroidal (wherein a length of a long axis is d and a length of a short axis is h) shape, with a value of aspect ratio d/h being in a range of 1.5≤d/h ≤20.

* * * * *